(12) United States Patent
Yoon et al.

(10) Patent No.: US 11,979,348 B2
(45) Date of Patent: May 7, 2024

(54) METHOD FOR REPORTING CHANNEL STATE INFORMATION IN UNLICENSED BAND AND DEVICE FOR SAME

(71) Applicant: LG ELECTRONICS INC., Seoul (KR)

(72) Inventors: Sukhyon Yoon, Seoul (KR); Seonwook Kim, Seoul (KR); Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 463 days.

(21) Appl. No.: 17/287,352

(22) PCT Filed: Oct. 31, 2019

(86) PCT No.: PCT/KR2019/014608
§ 371 (c)(1),
(2) Date: Apr. 21, 2021

(87) PCT Pub. No.: WO2020/096274
PCT Pub. Date: May 14, 2020

(65) Prior Publication Data
US 2021/0385037 A1    Dec. 9, 2021

(30) Foreign Application Priority Data

Nov. 8, 2018 (KR) .......................... 10-2018-0136495
Aug. 8, 2019 (KR) .......................... 10-2019-0096966

(51) Int. Cl.
*H04L 5/00* (2006.01)
*H04W 74/0808* (2024.01)

(52) U.S. Cl.
CPC ....... *H04L 5/0048* (2013.01); *H04W 74/0808* (2013.01)

(58) Field of Classification Search
CPC ..... H04L 1/00; H04L 27/0006; H04L 5/0048; H04W 74/0808
(Continued)

(56) References Cited

U.S. PATENT DOCUMENTS

2020/0029238 A1* 1/2020 Si ........................... H04W 24/10
2020/0112359 A1* 4/2020 Park ......................... H04L 5/023
(Continued)

FOREIGN PATENT DOCUMENTS

| KR | 1020160013506 A | 2/2016 |
|----|-----------------|--------|
| KR | 1020170110570 A | 10/2017 |
| WO | 2017047973 A1 | 3/2017 |

OTHER PUBLICATIONS

Spreadtrum Communications, "Considerations on the LBT procedures for NR-U", 3GPP TSG RAN WG1 Meeting #92bis, Apr. 16-Mar. 20, 2018, R1-1804230.
(Continued)

*Primary Examiner* — Robert J Lopata
(74) *Attorney, Agent, or Firm* — BRYAN CAVE LEIGHTON PAISNER LLP

(57) ABSTRACT

Disclosed is a method for a terminal to report channel state information (CSI) in an unlicensed band. In particular, this disclosure includes: receiving a channel state information-reference signal (CSI-RS) through at least one listen before talk (LBT) sub-band among a plurality of LBT sub-bands; measuring a plurality of pieces of CSI for each of the plurality of LBT sub-bands; generating wideband CSI for all of the plurality of LBT sub-bands on the basis of the plurality of pieces of CSI; and reporting the generated wideband CSI to a base station.

9 Claims, 32 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2020/0112484 | A1* | 4/2020 | Sun | H04L 5/003 |
| 2020/0228282 | A1* | 7/2020 | Kwak | H04L 5/0057 |
| 2020/0351011 | A1* | 11/2020 | Mukherjee | H04L 1/0026 |
| 2021/0021314 | A1* | 1/2021 | Sun | H04L 5/0051 |
| 2021/0392668 | A1* | 12/2021 | Yoon | H04L 5/0048 |
| 2021/0400719 | A1* | 12/2021 | Oh | H04L 1/1812 |
| 2022/0014337 | A1* | 1/2022 | Ouchi | H04W 74/0808 |
| 2022/0183079 | A1* | 6/2022 | Ouchi | H04W 16/14 |
| 2022/0287094 | A1* | 9/2022 | Tooher | H04L 5/005 |
| 2022/0311491 | A1* | 9/2022 | He | H04L 5/0053 |
| 2022/0337299 | A1* | 10/2022 | Sun | H04L 5/005 |

OTHER PUBLICATIONS

Motorola Mobility, Lenovo "Feature lead summary for NR-U DL Signals and Channels", 3GPP TSG RAN WG1 Meeting 94bis, Oct. 8-12, 2018, R1-1811911.

\* cited by examiner

FIG. 7
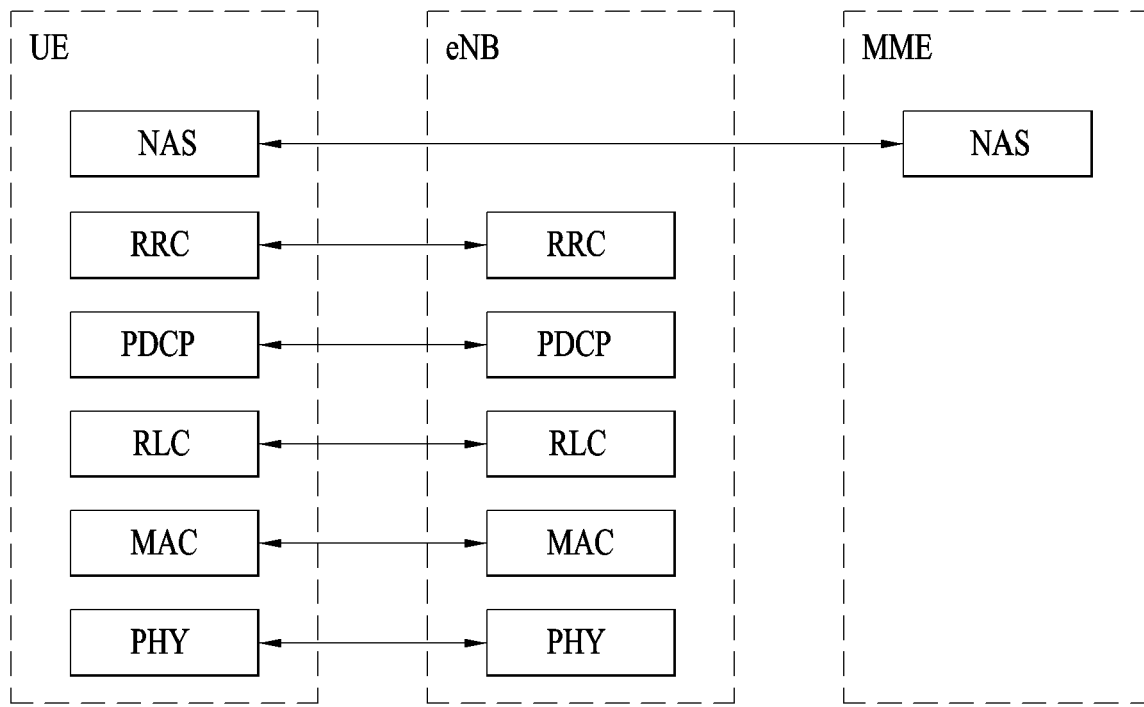
(A) CONTROL-PLANE PROTOCOL STACK
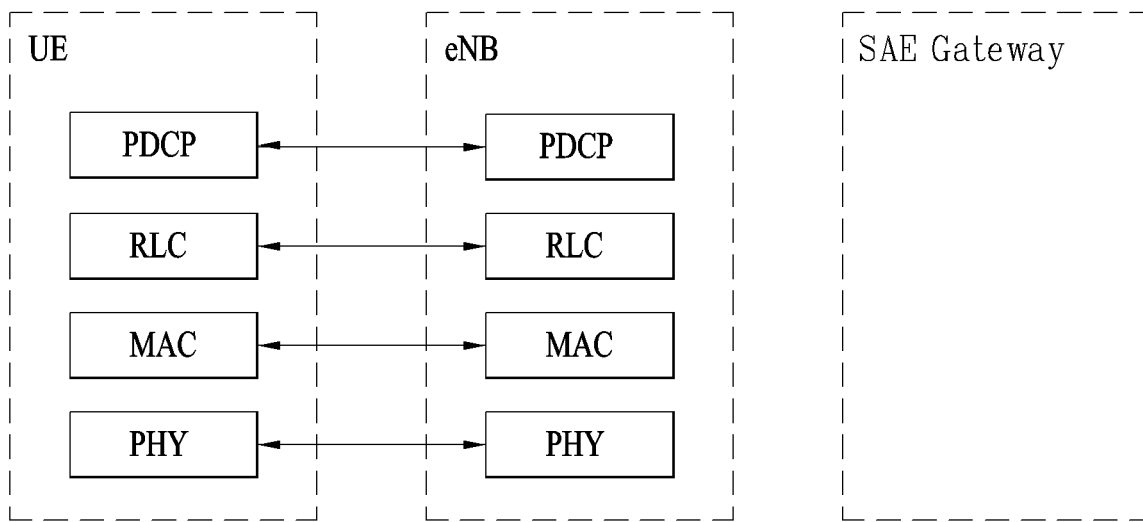
(B) USER-PLANE PROTOCOL STACK FIG. 19
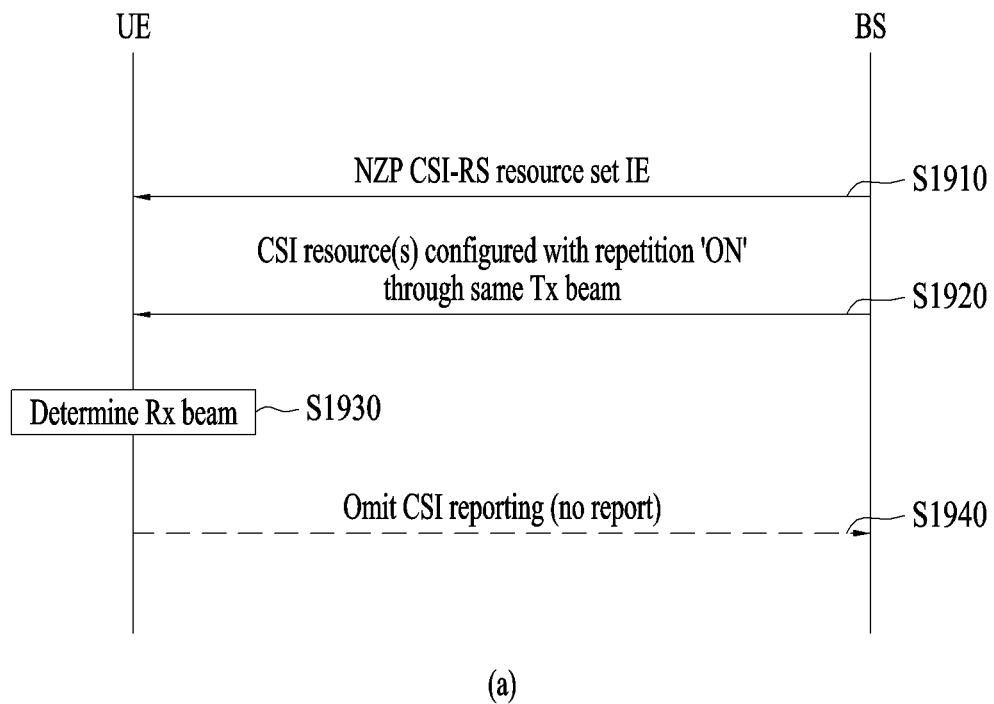
(a)
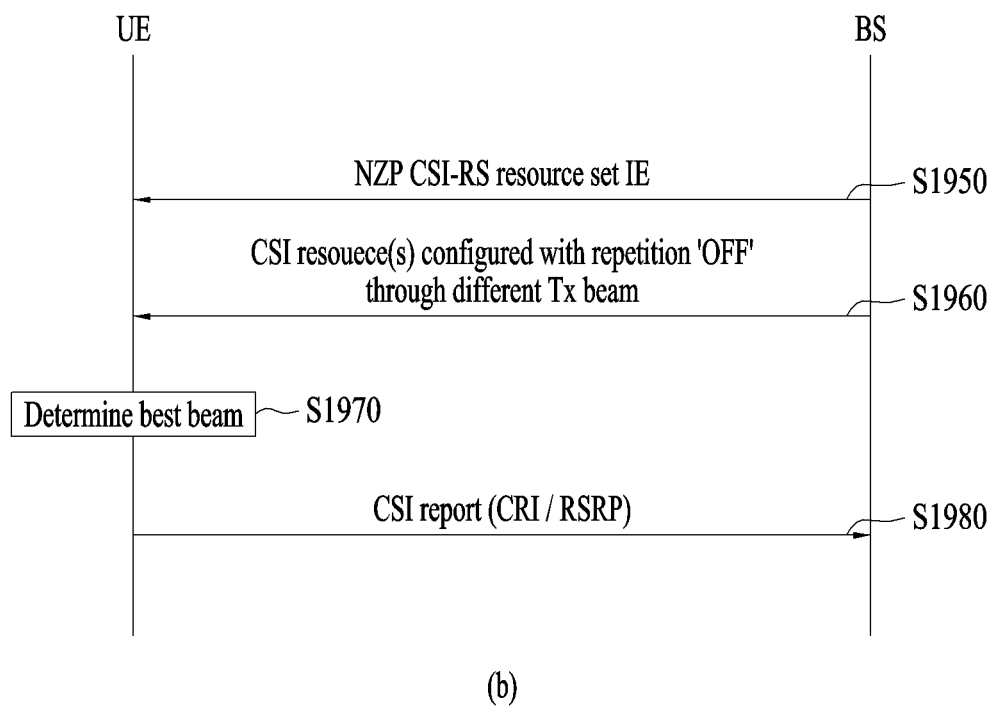
(b)

METHOD FOR REPORTING CHANNEL STATE INFORMATION IN UNLICENSED BAND AND DEVICE FOR SAME

This application is the National Stage filing under 35 U.S.C. 371 of International Application No. PCT/KR2019/014608 filed on Oct. 31, 2019, which claims the benefit of Korean Patent Application Nos. 10-2018-0136495 filed on Nov. 8, 2018 and 10-2019-0096966 filed on Aug. 8, 2019, the contents of which are all hereby incorporated by reference herein in their entirety.

TECHNICAL FIELD

The present disclosure relates to a method for reporting channel state information in an unlicensed band and a device for the same, and more particularly, to a method for reporting channel state information in an unlicensed band based on a channel state information-reference signal (CSI-RS) transmitted through multiple LBT sub-bands, and a device for the same.

BACKGROUND ART 5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

DISCLOSURE

Technical Problem

An object of the present disclosure is to provide a method for reporting channel state information in an unlicensed band and a device for the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, provided herein is a method for a method for reporting, by a terminal, channel state information (CSI) in an unlicensed band, the method including receiving a channel state information-reference signal (CSI-RS) through at least one Listen before Talk (LBT) sub-band among a plurality of LBT sub-bands, measuring a plurality of CSIs for each of the plurality of LBT sub-bands, generating a wideband CSI for all of the plurality of LBT sub-bands based on the plurality of CSIs, and reporting the generated wideband CSI to a base station.

Herein, the wideband CSI may be generated based on at least one CSI for the at least one LBT sub-band.

The reporting of the wideband CSI to the base station may include reporting information related to an LBT sub-band among the plurality of LBT sub-bands, the receiving of the CSI-RS being skipped in the LBT sub-band.

The wideband CSI may be generated based on at least one CSI including a channel quality value exceeding a threshold among the plurality of CSIs.

The wideband CSI may be generated based on the CSIs except at least one CSI related to an LBT sub-band among the plurality of CSIs, wherein, in the LBT sub-band, a probability that transmission of the CSI-RS will be skipped is greater than or equal to a predetermined probability.

The plurality of LBT sub-bands may be included in a CSI-RS transmission time closest to a time for reporting the wideband CSI, among a plurality of CSI-RS transmission times for transmitting the CSI-RS.

The terminal may be allowed to communicate with at least one of another terminal, a network, a base station, and an autonomous vehicle.

In another aspect of the present disclosure, provided herein is a terminal for reporting channel state information (CSI) in an unlicensed band, the terminal including at least one transceiver, at least one processor, and at least one memory operatively connected to the at least one processor and configured to store instructions, the instructions causing the at least one processor to perform a specific operation when executed, wherein the specific operation may include receiving a channel state information-reference signal (CSI-RS) through at least one Listen before Talk (LBT) sub-band among a plurality of LBT sub-bands through the at least one transceiver, measuring a plurality of CSIs for each of the plurality of LBT sub-bands, generating a wideband CSI for all of the plurality of LBT sub-bands based on the plurality of CSIs, and reporting the generated wideband CSI to a base station through the at least one transceiver.

The wideband CSI may be generated based on at least one CSI for the at least one LBT sub-band.

The reporting of the wideband CSI to the base station may include reporting information related to an LBT sub-band among the plurality of LBT sub-bands, the receiving of the CSI-RS being skipped in the LBT sub-band.

The wideband CSI may be generated based on at least one CSI including a channel quality value exceeding a threshold among the plurality of CSIs.

The wideband CSI may be generated based on the CSIs except at least one CSI related to an LBT sub-band among the plurality of CSIs, wherein, in the LBT sub-band, a probability that transmission of the CSI-RS will be skipped may be greater than or equal to a predetermined probability.

The plurality of LBT sub-bands may be included in a CSI-RS transmission time closest to a time for reporting the wideband CSI, among a plurality of CSI-RS transmission times for transmitting the CSI-RS.

The terminal may be allowed to communicate with at least one of another terminal, a network, a base station, and an autonomous vehicle.

In another aspect of the present disclosure, provided herein is a device for reporting channel state information (CSI) in an unlicensed band, the device including at least one processor, and at least one memory operatively connected to the at least one processor and configured to store instructions, the instructions causing the at least one processor to perform a specific operation when executed, wherein the specific operation may include receiving a channel state information-reference signal (CSI-RS) through at least one Listen before Talk (LBT) sub-band among a plurality of LBT sub-bands, measuring a plurality of CSIs for each of the plurality of LBT sub-bands, generating a wideband CSI for all of the plurality of LBT sub-bands based on the plurality of CSIs, and reporting the generated wideband CSI to a base station.

Advantageous Effects

According to the present disclosure, CSI reporting suitable for a channel state information-reference signal (CSI-RS) transmitted through multiple LBT subbands may be performed in an unlicensed band.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 7 is a diagram illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.

FIGS. 16 to 20 are diagrams illustrating beam management in the NR system.

BEST MODE

Figure 1:
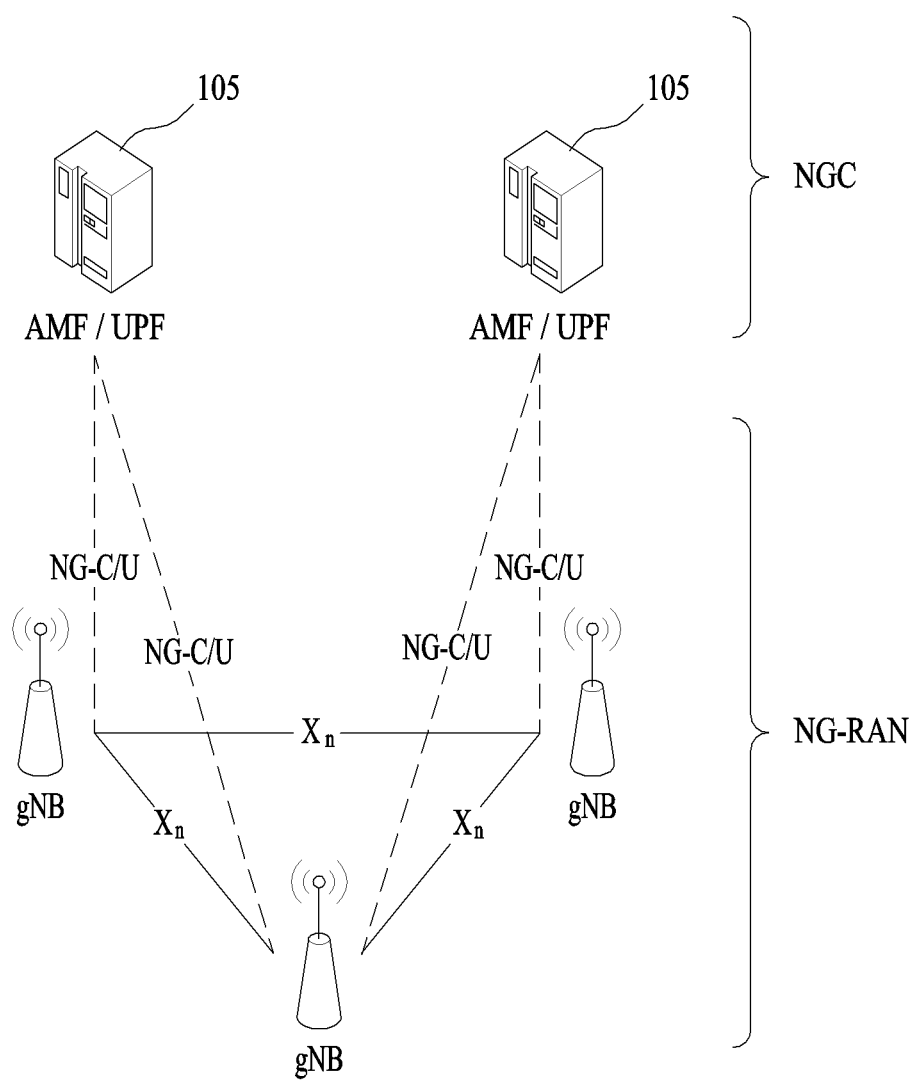
FIG. 1 is a diagram illustrating an example of NR system network architecture.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinafter, when it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinafter, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 is a diagram illustrating an example of NR system network architecture.

The network of the NR system is broadly composed of a next generation radio access network (NG-RAN) and a next generation core (NGC) network. The NGC is also referred to as SGC.

Referring to FIG. 1, the NG-RAN is composed of gNBs that provide terminals of user plane protocols (e.g., SDAP, PDCP, RLC, MAC, PHY) and control plane protocols (e.g., RRC, PDCP, RLC, MAC, PHY) for a UE. The gNBs are interconnected through an Xn interface. The gNBs are connected to the NGC through an NG interface. For example, a gNB is connected to a core network node having an access and mobility management function (AMF) through the N2 interface, which is one of the interfaces between the gNB and the NGC, and connected to a core network node having a user plane function (UPF) through the N3 interface, which is the other one of the interfaces between the gNB and the NGC. The AMF and the UPF may be implemented by different core network devices, respectively, or may be implemented by one core network device. In the RAN, transmission/reception of signals between the BS and the UE is performed through an air interface. For example, transmission/reception of a signal between a BS and a UE in the RAN is performed through physical resources (e.g., a radio frequency (RF)). On the other hand, in the core network, the transmission/reception of signals between the gNB and network functions (e.g., AMF, UPF) may be performed through a physical connection (e.g., optical cable) between core network nodes or a logical connection between the core network functions, not through the air interface.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 2:
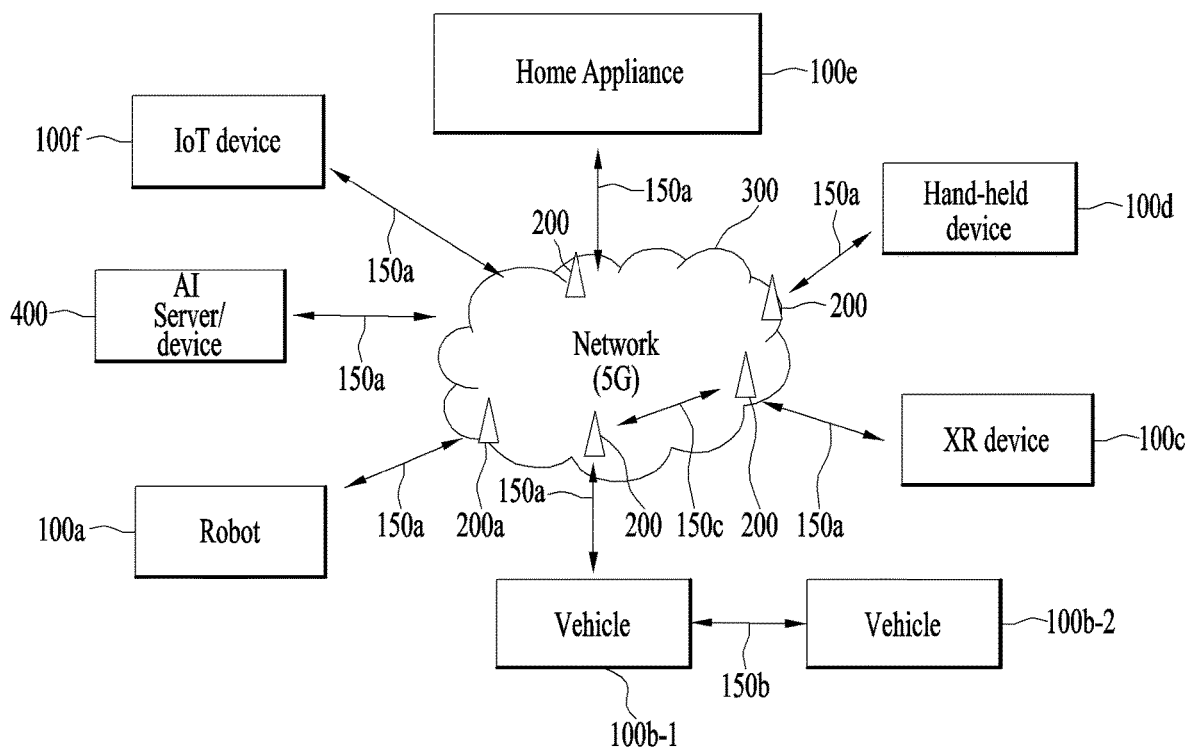
FIG. 2 illustrates an example of a communication system to which embodiments of the present disclosure are applied.

FIG. 2 illustrates a communication system 1 applied to the present disclosure.

Referring to FIG. 2, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., SL communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, SL communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Figure 3:
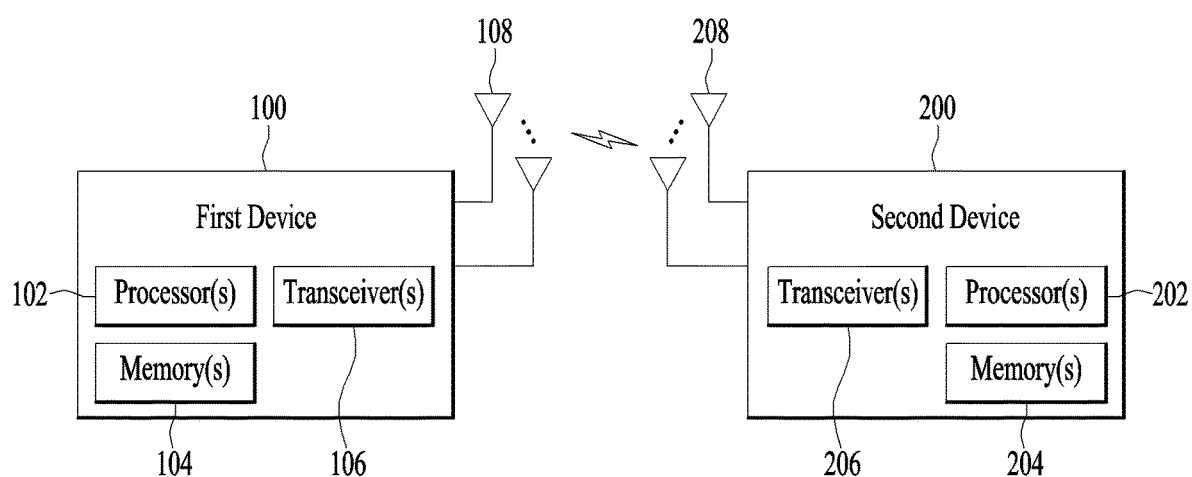
FIGS. 3 to 6 illustrate examples of various wireless devices and signal processing circuits to which embodiments of the present disclosure are applied.

FIG. 3 illustrates wireless devices applicable to the present disclosure.

Referring to FIG. 3, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 2.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, commands and/or operations controlled by the processor 102 of the first wireless device 100 and stored in the memory 104 according to an embodiment of the present disclosure will be described.

The following operations are described based on the control operation of the processor 102 from the perspective of the processor 102, but may be stored in the memory 104 as software code for performing these operations.

The processor 102 may control the transceiver 106 to receive information related to CSI-RS configuration from the second wireless device 200. The information may include a setting related to CSI-RS resource setting and information related to a bandwidth for transmitting a CSI-RS. The processor 102 may control the transceiver 106 to receive a CSI-RS through at least one LBT sub-band among multiple LBT sub-bands included in the entire bandwidth for CSI-RS transmission. In this case, a method of determining at least one LBT sub-band for receiving the CSI-RS may be based on embodiments to be described later.

The processor 102 may control the transceiver 106 to transmit the CSI measured based on the received CSI-RS to the second wireless device 200. In this case, a method of measuring and reporting CSI may be based on embodiments to be described later.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, commands and/or operations controlled by the processor 202 of the second wireless device 200 according to an embodiment of the present disclosure and stored in the memory 204 will be described.

The following operations are described based on the control operation of the processor 202 from the perspective of the processor 202, and may be stored in the memory 204 as software code or the like for performing these operations.

The processor 202 may control the transceiver 206 to transmit information for CSI-RS configuration to the first wireless device 100. The information may include a setting related to CSI-RS resource setting and information related to a bandwidth for transmitting a CSI-RS.

The processor 202 may divide the entire bandwidth for CSI-RS transmission into a plurality of Listen Before Talk (LBT) sub-bands, and perform LBT for each of the plurality of LBT sub-bands. In addition, the processor 202 may control the transceiver 206 to transmit the CSI-RS to the first wireless device 100 through at least one LBT sub-band based on the result of the LBT. In this case, a method of determining at least one LBT sub-band for transmitting the CSI-RS may be based on embodiments to be described later.

In addition, the processor 202 may control the transceiver 206 to receive, from the first wireless device 100, information related to the CSI measured based on the CSI-RS. In this case, a method of measuring and reporting CSI may be based on embodiments to be described later.

Figure 4:
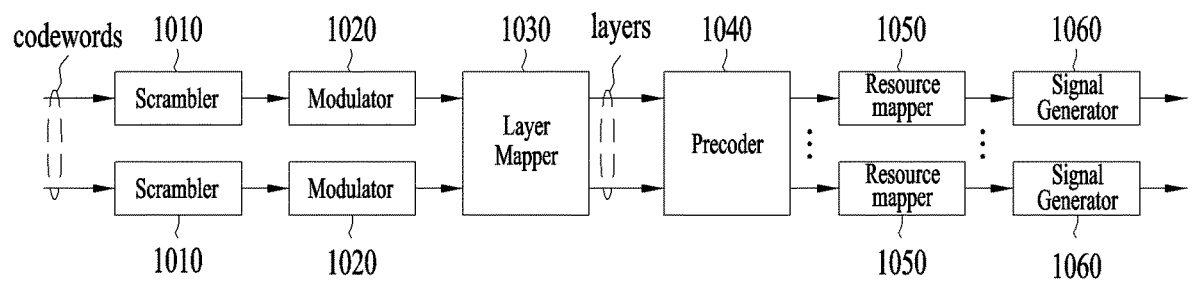

FIG. 4 illustrates a signal processing circuit for Tx signals.

Referring to FIG. 4, a signal processing circuit 1000 may include a scrambler 1010, a modulator 1020, a layer mapper 1030, a precoder 1040, a resource mapper 1050, and a signal generator 1060. The operations/functions shown in FIG. 3 may be performed by the processors 102 and 202 and/or the transceivers 106 and 206 shown in FIG. 3, without being limited thereto. Hardware elements shown in FIG. 3 may be implemented by the processors 102 and 202 and/or the transceivers 106 and 206 shown in FIG. 3. For example, the blocks 1010 to 1060 may be implemented by the processors 102 and 202. In addition, the blocks 1010 to 1050 may be implemented by the processors 102 and 202 shown in FIG. 3, and the block 1060 may be implemented by the transceivers 106 and 206 shown in FIG. 3.

The codeword may be converted into a radio signal (or a radio frequency (RF) signal) through the signal processing circuit 1000 shown in FIG. 4. Here, the codeword may be a coded bit sequence of an information block. The information block may include a transmission (Tx) block (e.g., UL-SCH transmission block, and/or DL-SCH transmission block). The radio signal may be transmitted through various physical channels (e.g., PUSCH, and PDSCH).

In more detail, the codeword may be converted into a bit sequence scrambled by the scrambler 1010. The scramble sequence used for such scrambling may be generated based on an initialization value, and the initialization value may include ID information of a wireless device, etc. The scrambled bit-sequence may be modulated into a modulated symbol sequence by the demodulator 1020. The modulation scheme may include pi/2-BPSK (pi/2-Binary Phase Shift Keying), m-PSK (m-Phase Shift Keying), m-QAM (m-Quadrature Amplitude Modulation), etc. The complex modulated symbol sequence may be mapped to one or more transmission (Tx) layers by the layer mapper 1030. Modulated symbols of the respective Tx layers may be mapped (precoded) to the corresponding antenna port(s) by the precoder 1040. The output value (z) of the precoder 1040 may be obtained by multiplying the output value (y) of the layer mapper 1030 by the (N×M) precoding matrix (W). In this case, N is the number of antenna ports, and M is the number of Tx layers. In this case, the precoder 1040 may perform precoding after transform precoding (e.g., DFT transform) is performed on the complex modulated symbols. In this case, the precoder 1040 may perform precoding without performing transform precoding.

The resource mapper 1050 may map the modulated symbols of the respective antenna ports to time-frequency resources. The time-frequency resources may include a plurality of symbols (e.g., CP-OFDMA symbol and DFT-s-OFDMA symbol) in the time domain, and may include a plurality of subcarriers in the frequency domain. The signal generator 1060 may generate radio signals from the mapped modulated symbols, and the generated radio signals may be transferred to other devices through the respective antennas. To this end, the signal generator 1060 may include an inverse fast Fourier transform (IFFT) module, a cyclic prefix (CP) inserter, a digital-to-analog converter (DAC), a frequency uplink converter, etc.

The signal processing steps for reception (Rx) signals in the wireless device may be arranged in the reverse order of the signal processing steps 1010 to 1060 shown in FIG. 4. For example, the wireless devices 100 and 200 (shown in FIG. 3) may receive radio signals from the outside through the antenna ports/transceivers. The received radio signals may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to the codeword after passing through the resource demapper process, the postcoding process, the demodulation process, and the descrambling process. The codeword may be restored to an original information block through decoding. Therefore, the signal processing circuit (not shown) for Rx signals may include a signal restorer, a resource demapper, a postcoder, a demodulator, a descrambler, and a decoder.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 5:
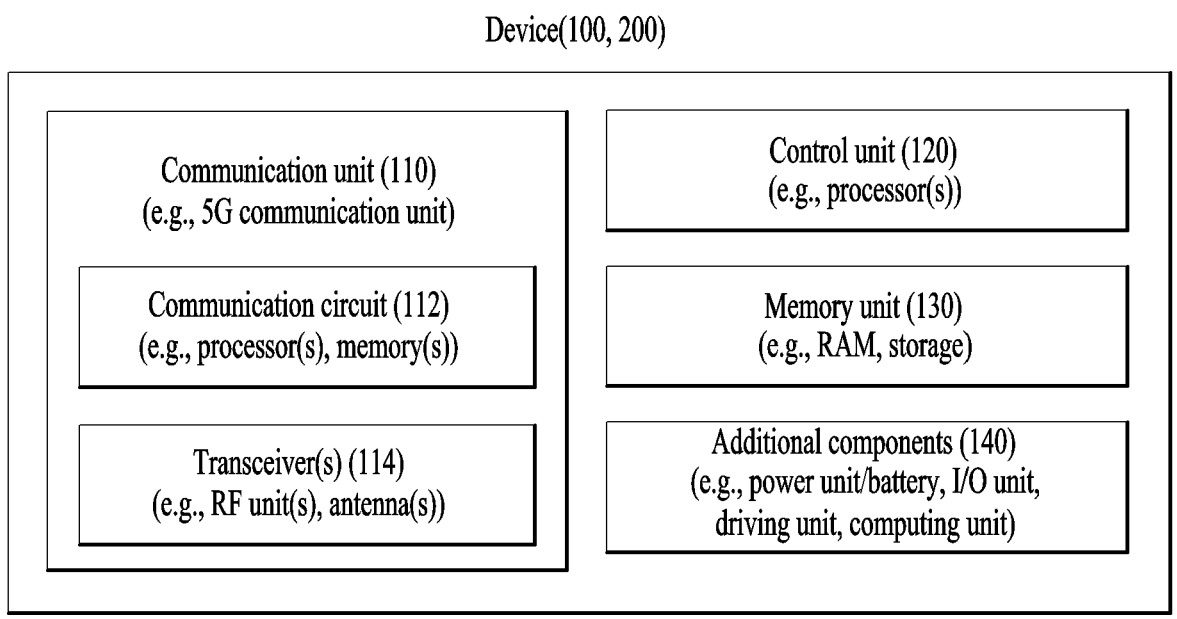

FIG. 5 illustrates another example of a wireless device applied to the present disclosure. The wireless device may be implemented in various forms according to a use case/service (refer to FIG. 3).

Figure 25:
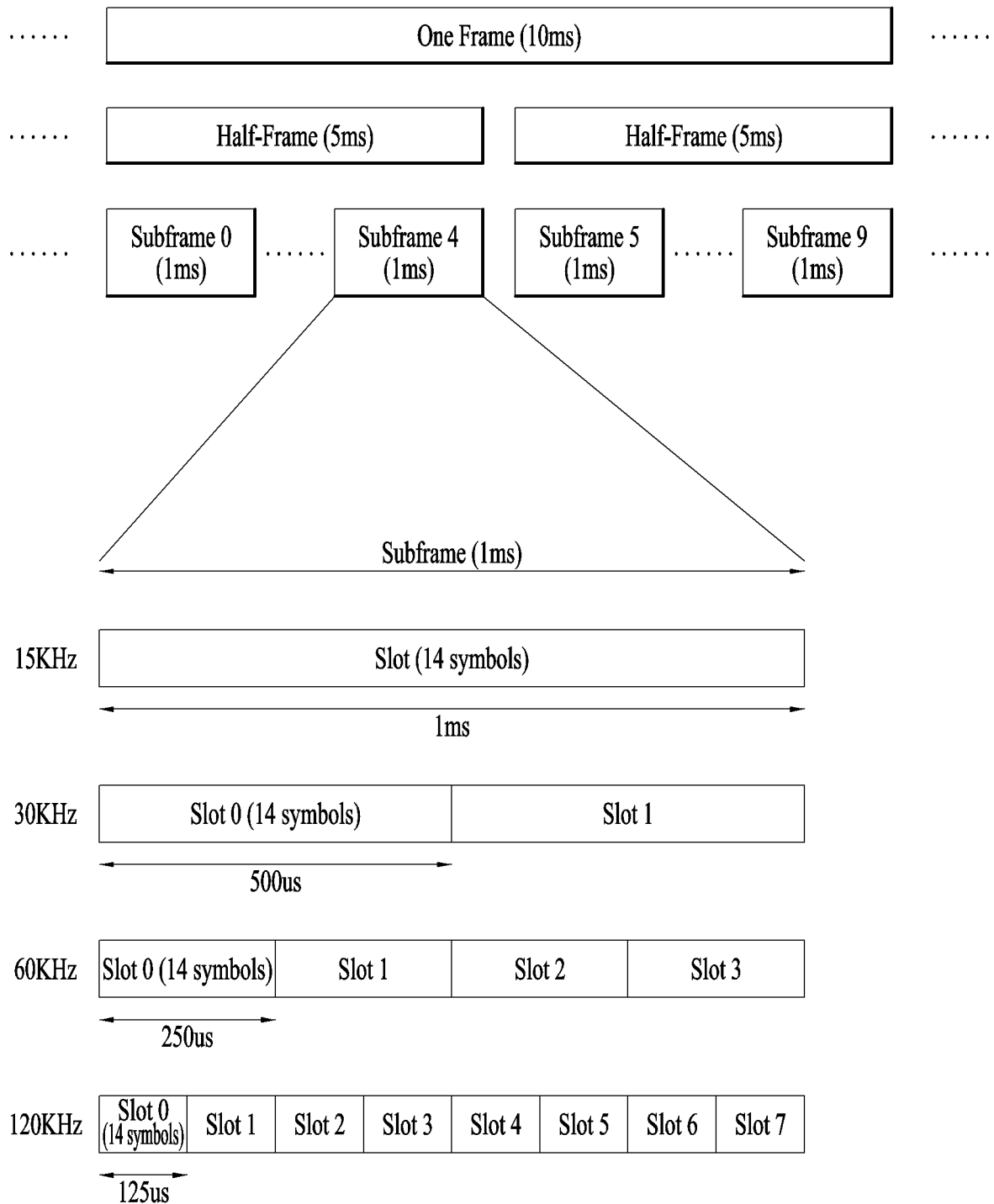
FIGS. 25 to 27 are diagrams illustrating structures of a radio frame and slots used in a new RAT (NR) system.

Referring to FIG. 5, wireless devices 100 and 200 may correspond to the wireless devices 100 and 200 of FIG. 25 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 5. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 3), the vehicles (100b-1 and 100b-2 of FIG. 3), the XR device (100c of FIG. 3), the hand-held device (100d of FIG. 3), the home appliance (100e of FIG. 3), the IoT device (100f of FIG. 3), a digital broadcasting terminal, a hologram device, a public safety device, an MTC device, a medical device, a FinTech device (or a finance device), a security device, a climate/environment device, the AI server/device (400 of FIG. 3), the BSs (200 of FIG. 3), a network node, or the like. The wireless device may be mobile or fixed according to a use case/service.

In FIG. 5, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

The implementation example of FIG. 5 will hereinafter be described with reference to the attached drawings.

Figure 6:
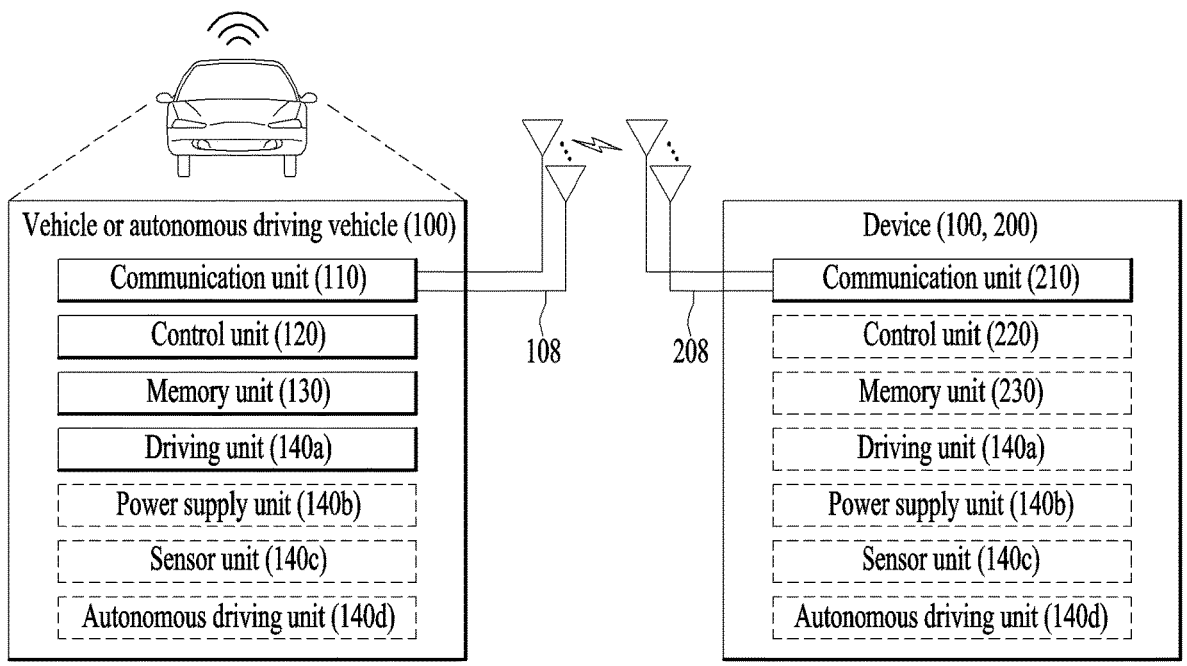

FIG. 6 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 6, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 5, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

FIG. 7 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 8:
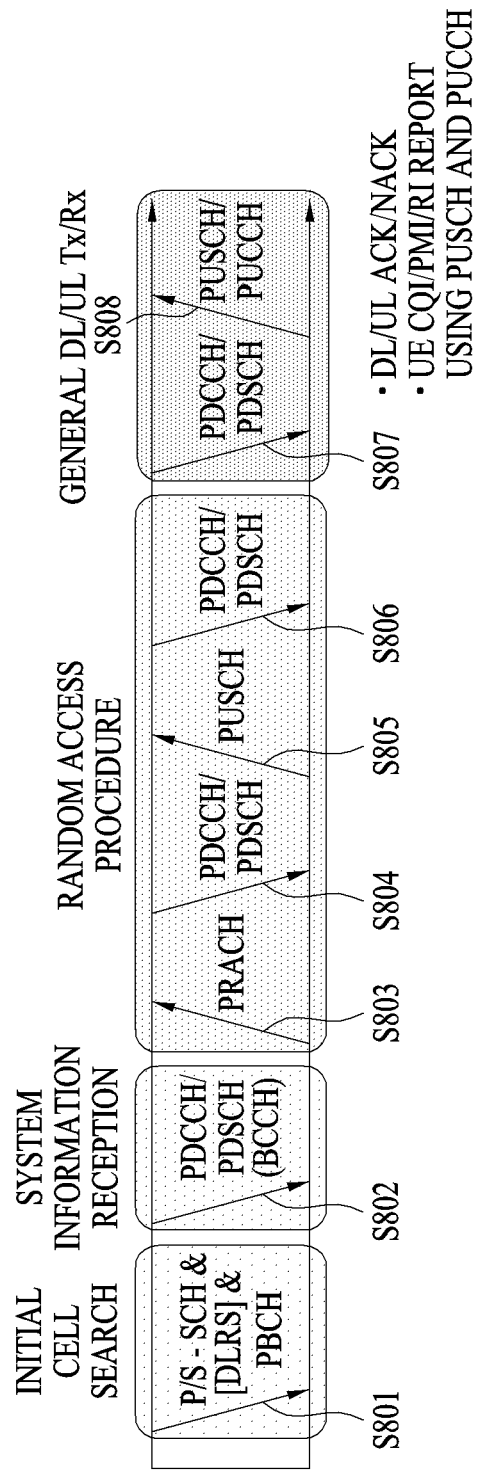
FIG. 8 is a diagram illustrating physical channels and a general signal transmission method using the physical channels in a 3GPP system.

FIG. 8 illustrates physical channels and a general method for transmitting signals on the physical channels in the 3GPP system.

Referring to FIG. 8, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S802).

If the UE initially accesses the eNB or has no radio resources for signal transmission to the eNB, the UE may perform a random access procedure with the eNB (S803 to S806). In the random access procedure, the UE may transmit a predetermined sequence as a preamble on a physical random access channel (PRACH) (S803 and S805) and may receive a response message to the preamble on a PDCCH and a PDSCH associated with the PDCCH (S804 and S806). In the case of a contention-based RACH, the UE may additionally perform a contention resolution procedure.

After the above procedure, the UE may receive a PDCCH and/or a PDSCH from the eNB (S807) and transmit a physical uplink shared channel (PUSCH) and/or a physical uplink control channel (PUCCH) to the eNB (S808), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

Figure 9:
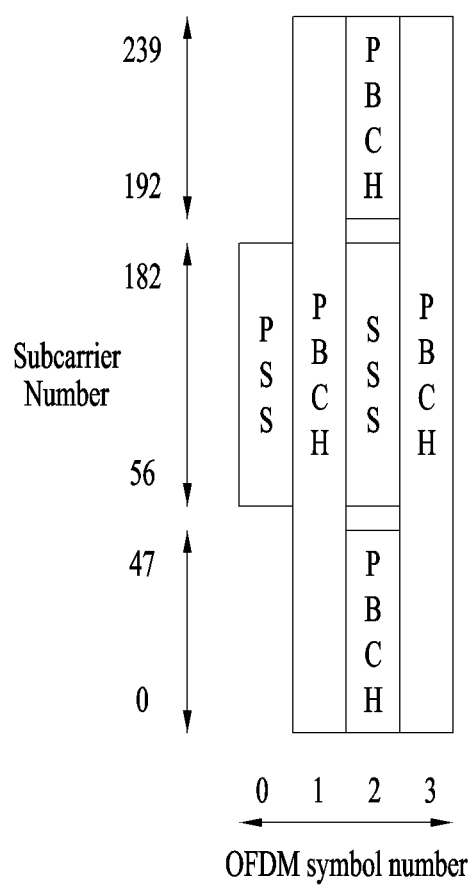
FIGS. 9 and 10 are diagrams illustrating the composition of a synchronization signal/physical broadcast channel (SS/PBCH) block and a method of transmitting an SS/PBCH block.

FIG. 9 illustrates an SSB structure. The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 9, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 1 below.

TABLE 1

| Type of Signals | Operations |
|---|---|
| $1^{st}$ step PSS | SS/PBCH block (SSB) symbol timing acquisition Cell ID detection within a cell ID group (3 hypothesis) |
| $2^{nd}$ Step SSS | Cell ID group detection (336 hypothesis) |
| $3^{rd}$ Step PBCH DMRS | SSB index and Half frame (HF) index (Slot and frame boundary detection) |
| $4^{th}$ Step PBCH | Time information (80 ms, System Frame Number (SFN), SSB index, HF) Remaining Minimum System Information (RMSI) Control resource set (CORESET)/Search space configuration |
| $5^{th}$ Step PDCCH and PDSCH | Cell access information RACH configuration |

There are 336 cell ID groups. There are 3 cell IDs for each cell ID group. There are 1008 cell IDs in a total. Information on a cell ID group to which the cell ID of a cell belongs is provided/acquired through the SSS of the cell, and information on the cell ID among the 336 cells in the cell ID is provided/acquired through the PSS.

Figure 10:
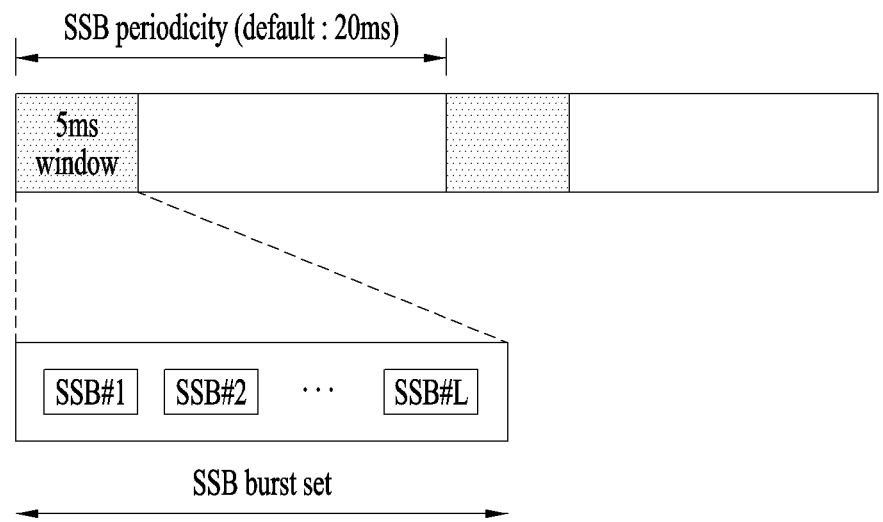

FIG. 10 illustrates SSB transmission. Referring to FIG. 10, an SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time positions of SSB candidates are indexed as (SSB indexes) 0 to L−1 in temporal order within the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

The random access procedure of the UE may be summarized as shown in Table 2 and FIG. 10.

TABLE 2

| | Type of Signal | Operation/information acquired |
|---|---|---|
| Step 1 | PRACH preamble on UL | Initial beam acquisition<br>Random access preamble ID selection |
| Step 2 | Random access response on PDSCH | Timing advance information<br>Random access preamble ID<br>Initial UL grant, temporary C-RNTI |
| Step 3 | UL transmission on PUSCH | RRC connection request<br>UE identifier |
| Step 4 | Contention resolution on DL | Temporary C-RNTI on PDCCH for initial access<br>C-RNTI on PDCCH for RRC_CONNECTED UE |

Figure 11:
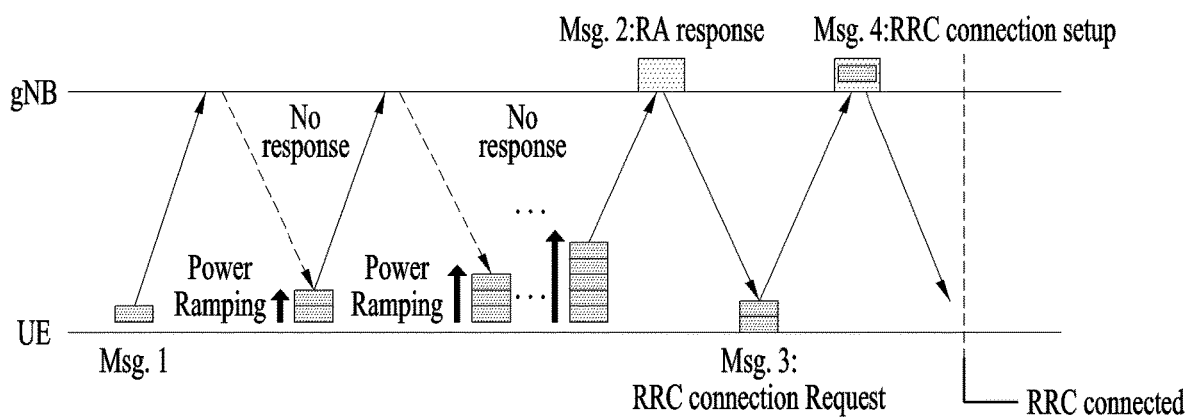
FIG. 11 is a diagram illustrating an example of a random access procedure.

The random access procedure is used for various purposes. For example, the random access procedure may be used for initial network access, handover, and UE-triggered UL data transmission. The UE may acquire UL synchronization and UL transmission resources through a random access procedure. The random access procedure is divided into a contention-based random access procedure and a contention free random access procedure. FIG. 11 is a diagram illustrating an example of a random access procedure. In particular, FIG. 9 illustrates a contention-based random access procedure.

First, the UE may transmit a random access preamble on the PRACH as Msg1 of the random access procedure on UL.

Random access preamble sequences having two different lengths are supported. Long sequence length 839 is applied for subcarrier spacing of 1.25 kHz and 5 kHz, and short sequence length 139 is applied for subcarrier spacing of 15 kHz, 30 kHz, 60 kHz and 120 kHz.

Multiple preamble formats are defined by one or more RACH OFDM symbols and different cyclic prefixes (and/or a guard time). RACH configuration for a cell is included in the system information of the cell and provided to the UE. The RACH configuration includes information on the subcarrier spacing of the PRACH, available preambles, and preamble formats. The RACH configuration includes information about association between SSBs and RACH (time-frequency) resources. The UE transmits a random access preamble on the RACH time-frequency resource associated with a detected or selected SSB.

An SSB threshold for RACH resource association may be set by the network, and transmission and retransmission of the RACH preamble are performed based on an SSB in which reference signal received power (RSRP) measured based on the SSB satisfies the threshold. For example, the UE may select one of SSB(s) satisfying the threshold, and transmit or retransmit the RACH preamble based on the RACH resource associated with the selected SSB.

When the BS receives the random access preamble from the UE, the BS transmits a random access response (RAR) message (Msg2) to the UE. A PDCCH for scheduling a PDSCH carrying the RAR is transmitted after being CRC masked with a random access (RA) radio network temporary identifier (RNTI) (RA-RNTI). Upon detecting the PDCCH masked with the RA-RNTI, the UE may receive the RAR from the PDSCH scheduled by DCI carried by the PDCCH. The UE checks whether RAR information for the preamble transmitted by the UE, that is, Msg1, is in the RAR. Whether there is random access information for Msg1 transmitted by the UE may be determined based on whether there is a RA preamble ID for the preamble transmitted by the UE. When there is no response to Msg1, the UE may retransmit the RACH preamble within a predetermined number of times while performing power ramping. The UE calculates the PRACH transmission power for the retransmission of the preamble based on the most recent path loss and power ramping counter.

When the UE receives the RAR information intended therefor on the PDSCH, the UE may recognize timing advance information for UL synchronization, an initial UL grant, and a UE temporary cell RNTI (cell RNTI (C-RNTI)). The timing advance information is used to control the uplink signal transmission timing. In order to better align the PUSCH/PUCCH transmission by the UE with the subframe timing at the network side, the network (e.g., the BS) may measure the time difference between PUSCH/PUCCH/SRS reception and subframes, and send timing advance information based on the measured difference. The UE may perform UL transmission as Msg3 in a random access procedure on an uplink shared channel based on the RAR information. Msg3 may include an RRC connection request and a UE identifier. In response to Msg3, the network may transmit Msg4, which may be treated as a contention resolution message on DL. By receiving Msg4, the UE may enter the RRC connected mode.

The contention-free random access procedure may be used when the UE performs handover to another cell or BS or the procedure is requested by a command from the BS. The basic process of the contention-free random access procedure is similar to the contention-based random access procedure. However, in the contention-free random access procedure, a preamble to be used by the UE (hereinafter, a dedicated RA preamble) is assigned to the UE by the BS, unlike in the contention-based random access procedure, in which the UE randomly selects a preamble to use among a plurality of RA preambles. Information on the dedicated RA preamble may be included in an RRC message (e.g., a handover command) or may be provided to the UE through a PDCCH order. When the RA procedure is initiated, the UE transmits the dedicated RA preamble to the BS. When the UE receives the RA procedure from the BS, the RA procedure is completed.

As mentioned above, the UL grant in the RAR schedules PUSCH transmission for the UE. The PUSCH carrying the initial UL transmission by the UL grant in the RAR is also referred to as Msg3 PUSCH. The content of the RAR UL grant starts at the MSB and ends at the LSB, and is given in Table 3.

TABLE 3

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

The TPC command is used to determine the transmit power of the Msg3 PUSCH, and is interpreted according to, for example, Table 4.

TABLE 4

| TPC command | value [dB] |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In the contention-free random access procedure, the CSI request field in the RAR UL grant indicates whether the UE will include aperiodic CSI report in the PUSCH transmission. The subcarrier spacing for Msg3 PUSCH transmission is provided by the RRC parameter. The UE will transmit the PRACH and Msg3 PUSCH on the same uplink carrier of the same serving cell. The UL BWP for Msg3 PUSCH transmission is indicated by System Information Block1 (SIB1).

DL Channel Structures

An eNB transmits related signals on later-described DL channels to a UE, and the UE receives the related signals on the DL channels from the eNB.

(1) Physical Downlink Shared Channel (PDSCH)

The PDSCH delivers DL data (e.g., a DL-shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (physical) resource block ((P)RB)).

Figure 12:
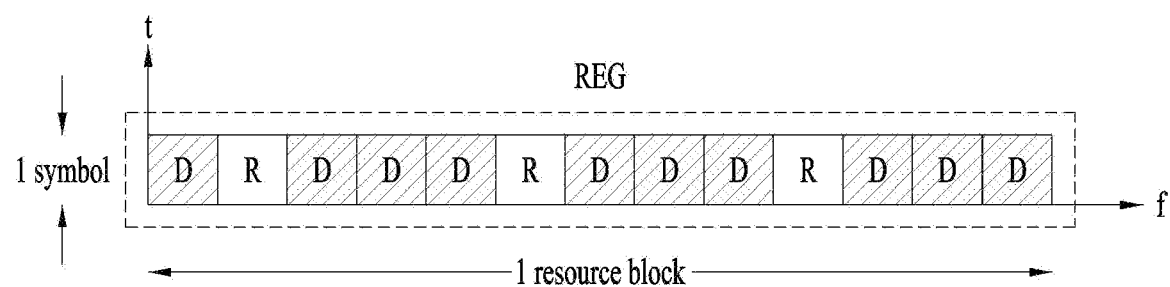
FIGS. 12, 13, and 14 are diagrams illustrating a physical downlink control channel (PDCCH) in the NR system.

FIG. 12 illustrates an exemplary structure of one REG. In FIG. 12, D represents an RE to which DCI is mapped, and R represents an RE to which a DMRS is mapped. The DMRS is mapped to RE #1, RE #5, and RE #9 along the frequency direction in one symbol.

The PDCCH is transmitted in a control resource set (CORESET). A CORESET is defined as a set of REGs with a given numerology (e.g., an SCS, a CP length, or the like). A plurality of CORESETs for one UE may overlap with each other in the time/frequency domain. A CORESET may be configured by system information (e.g., a master information block (MIB)) or UE-specific higher-layer signaling (e.g., RRC signaling). Specifically, the number of RBs and the number of symbols (3 at maximum) in the CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner That is, the REGs are sequentially numbered in an ascending order, starting from 0 for the first OFDM symbol of the lowest-numbered RB in the CORESET.

Figure 13:
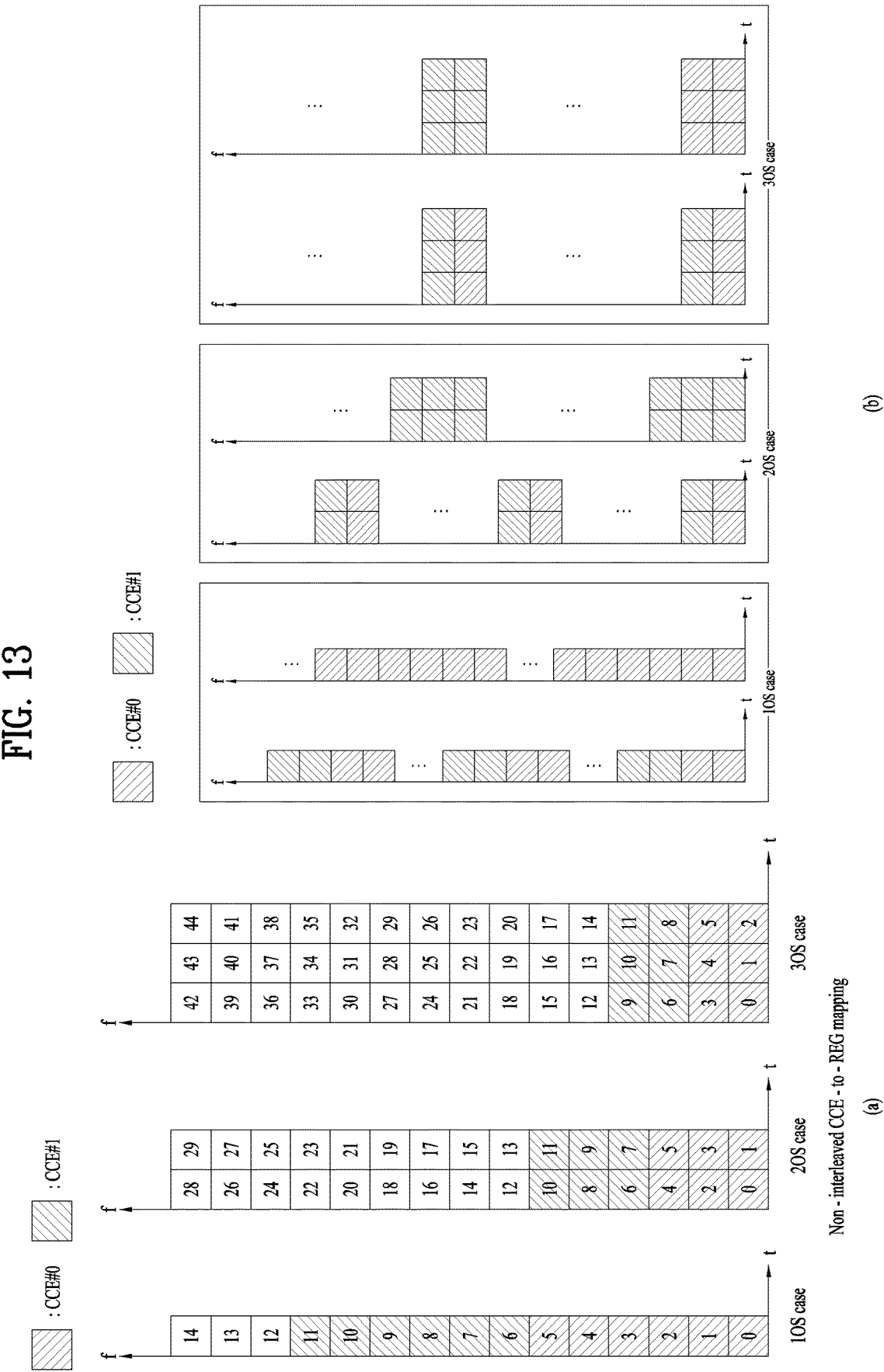

CCE-to-REG mapping for the CORESET may be an interleaved type or a non-interleaved type. FIG. 13(a) is an exemplary view illustrating non-interleaved CCE-REG mapping, and FIG. 13(b) is an exemplary view illustrating interleaved CCE-REG mapping.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 14:
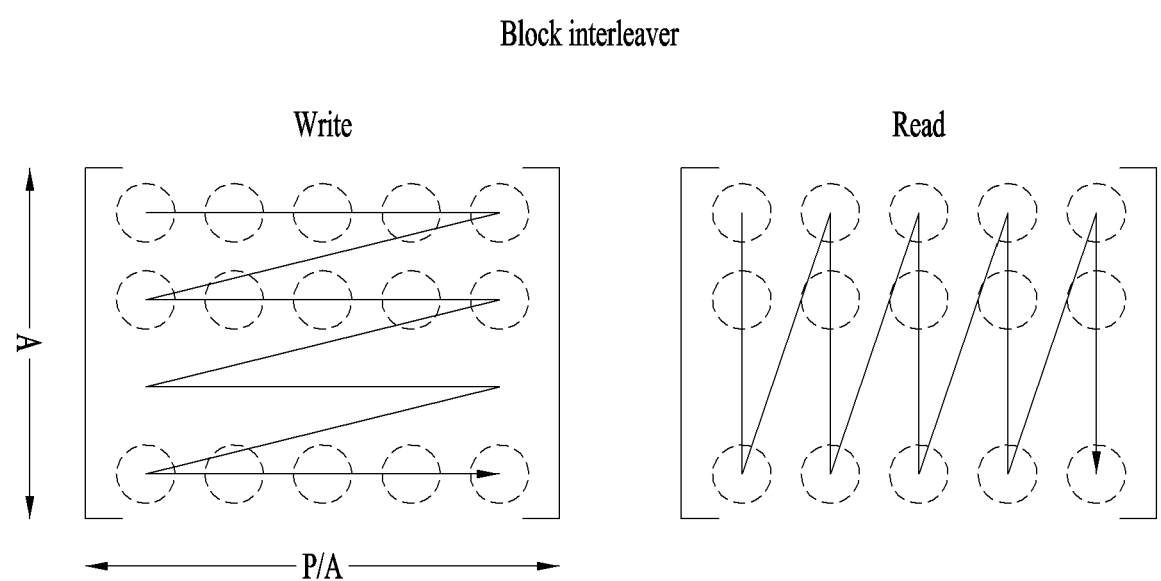

FIG. 14 illustrates an exemplary block interleaver. For the above interleaving operation, the number A of rows in a (block) interleaver is set to one or 2, 3, and 6. When the number of interleaving units for a given CORESET is P, the number of columns in the block interleaver is P/A. In the block interleaver, a write operation is performed in a row-first direction, and a read operation is performed in a column-first direction, as illustrated in FIG. 14. Cyclic shift (CS) of an interleaving unit is applied based on an ID which is configurable independently of a configurable ID for the DMRS.

The UE acquires DCI delivered on a PDCCH by decoding (so-called blind decoding) a set of PDCCH candidates. A set of PDCCH candidates decoded by a UE are defined as a PDCCH search space set. A search space set may be a common search space or a UE-specific search space. The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in the CORESET) in a PDCCH monitoring slot.

nrofCandidates: The number of PDCCH candidates (one of 0, 1, 2, 3, 4, 5, 6, and 8) for each AL={1, 2, 4, 8, 16}.

Table 5 lists exemplary features of the respective search space types.

TABLE 5

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 6 lists exemplary DCI formats transmitted on the PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

UL Channel Structure

A UE transmits signals over the following UL channels to a BS. In other words, the BS receives the signals from the UE over the following UL channels.

(1) Physical Uplink Shared Channel (PUSCH)

The PUSCH carries UL data (e.g., UL-shared channel transport block (UL-SCH TB)) and/or UCI. The PUSCH is transmitted based on a cyclic prefix orthogonal frequency division multiplexing (CP-OFDM) waveform or a discrete Fourier transform spread orthogonal frequency division multiplexing (DFT-s-OFDM) waveform. When the PUSCH is transmitted in the DFT-s-OFDM waveform, the UE transmits the PUSCH by applying transform precoding. For example, when transform precoding is disabled, the UE may transmit the PUSCH in the CP-OFDM waveform. When transform precoding is enabled, the UE may transmit the PUSCH in the CP-OFDM or DFT-s-OFDM waveform. The PUSCH transmission may be dynamically scheduled by a UL grant in DCI. Alternatively, the PUSCH transmission may be semi-statically scheduled by higher layer signaling (e.g., RRC signaling) (and/or Layer 1 (L1) signaling (e.g., PDCCH)) (configured grant). Both codebook based PUSCH transmission and non-codebook based PUSCH transmission may be allowed.

(2) Physical Uplink Control Channel (PUCCH)

The PUCCH carries UCI, a HARQ-ACK, and/or an SR. Depending on the transmission duration of the PUCCH, the PUCCH is classified into a short PUCCH and a long PUCCH. Table 4 shows PUCCH formats.

TABLE 7

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4 14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

In the NR system, a massive multiple input multiple output (MIMO) environment in which the number of transmission/reception (Tx/Rx) antennas is significantly increased may be under consideration. That is, as the massive MIMO environment is considered, the number of Tx/Rx antennas may be increased to a few tens or hundreds. The NR system supports communication in an above 6 GHz band, that is, a millimeter frequency band. However, the millimeter frequency band is characterized by the frequency property that a signal is very rapidly attenuated according to a distance due to the use of too high a frequency band. Therefore, in an NR system operating at or above 6 GHz, beamforming (BF) is considered, in which a signal is transmitted with concentrated energy in a specific direction, not omni-directionally, to compensate for rapid propagation attenuation. Accordingly, there is a need for hybrid BF with analog BF and digital BF in combination according to a position to which a BF weight vector/precoding vector is applied, for the purpose of increased performance, flexible resource allocation, and easiness of frequency-wise beam control in the massive MIMO environment.

Figure 15:
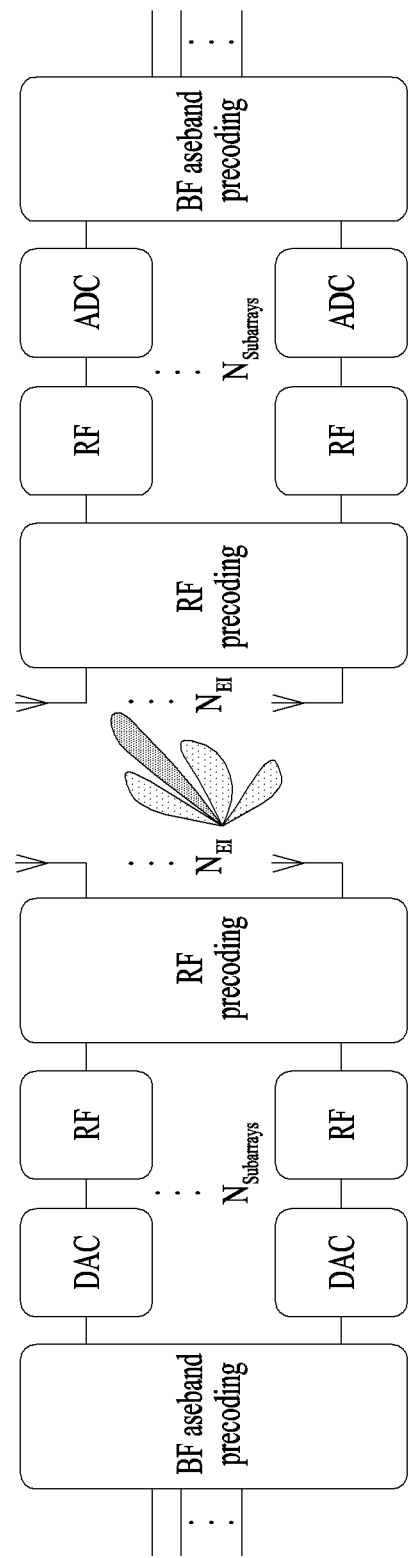
FIG. 15 is a diagram illustrating analog beamforming in the NR system.

FIG. 15 is a block diagram illustrating an exemplary transmitter and receiver for hybrid BF.

To form a narrow beam in the millimeter frequency band, a BF method is mainly considered, in which a BS or a UE transmits the same signal through multiple antennas by applying appropriate phase differences to the antennas and thus increasing energy only in a specific direction. Such BF methods include digital BF for generating a phase difference for digital baseband signals, analog BF for generating phase differences by using time delays (i.e., cyclic shifts) for modulated analog signals, and hybrid BF with digital BF and analog beamforming in combination. Use of a radio frequency (RF) unit (or transceiver unit (TXRU)) for antenna element to control transmission power and phase control on antenna element basis enables independent BF for each frequency resource. However, installing TXRUs in all of about 100 antenna elements is less feasible in terms of cost. That is, a large number of antennas are required to compensate for rapid propagation attenuation in the millimeter frequency, and digital BF needs as many RF components (e.g., digital-to-analog converters (DACs), mixers, power amplifiers, and linear amplifiers) as the number of antennas. As a consequence, implementation of digital BF in the millimeter frequency band increases the prices of communication devices. Therefore, analog BF or hybrid BF is considered, when a large number of antennas are needed as is the case with the millimeter frequency band. In analog BF, a plurality of antenna elements are mapped to a single TXRU and a beam direction is controlled by an analog phase shifter. Because only one beam direction is generated across a total band in analog BF, frequency-selective BF may not be achieved with analog BF. Hybrid BF is an intermediate form of digital BF and analog BF, using B RF units fewer than Q antenna elements. In hybrid BF, the number of beam directions available for simultaneous transmission is limited to B or less, which depends on how B RF units and Q antenna elements are connected.

Downlink Beam Management (DL BM)

BM is a series of processes for acquiring and maintaining a set of BS (or transmission and reception point (TRP)) beams and/or UE beams available for DL and UL transmissions/receptions. BM may include the following processes and terminology.

Beam measurement: the BS or the UE measures the characteristics of a received beamformed signal.

Beam determination: the BS or the UE selects its Tx beam/Rx beam.

Beam sweeping: a spatial domain is covered by using Tx beams and/or Rx beams in a predetermined manner during a predetermined time interval.

Beam report: the UE reports information about a beamformed signal based on a beam measurement.

The BM procedure may be divided into (1) a DL BM procedure using an SSB or CSI-RS and (2) a UL BM procedure using an SRS. Further, each BM procedure may include Tx beam sweeping for determining a Tx beam, and Rx beam sweeping for determining an Rx beam.

The DL BM procedure may include (1) transmission of beamformed DL RSs (e.g., CSI-RS or SSB) from the BS and (2) beam reporting from the UE.

A beam report may include preferred DL RS ID(s) and reference signal received power(s) (RSRP(s)) corresponding to the preferred DL RS ID(s). A DL RS ID may be an SSB resource indicator (SSBRI) or a CSI-RS resource indicator (CRI).

Figure 16:
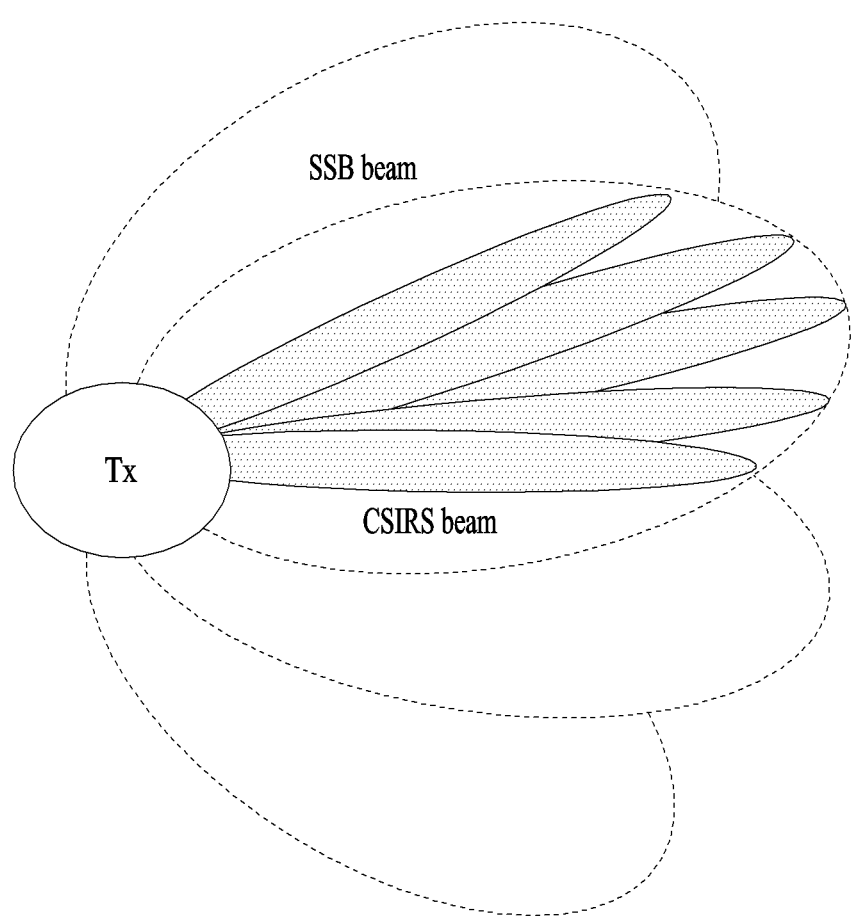

FIG. 16 is a diagram illustrating exemplary BF using an SSB and a CSI-RS.

Referring to FIG. 16, an SSB beam and a CSI-RS beam may be used for beam measurement. A measurement metric is the RSRP of each resource/block. The SSB may be used for coarse beam measurement, whereas the CSI-RS may be used for fine beam measurement. The SSB may be used for both Tx beam sweeping and Rx beam sweeping. SSB-based Rx beam sweeping may be performed by attempting to receive the SSB for the same SSBRI, while changing an Rx beam across multiple SSB bursts at a UE. One SS burst includes one or more SSBs, and one SS burst set includes one or more SSB bursts.

1. DL BM Using SSB

Figure 17:
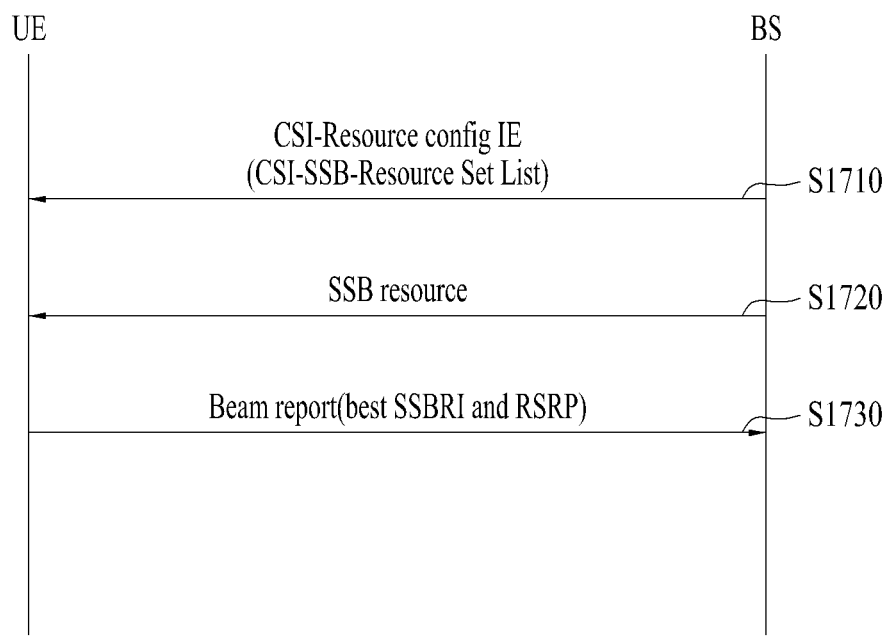

FIG. 17 is a diagram illustrating a signal flow for an exemplary DL BM process using an SSB.

An SSB-based beam report is configured during CSI/beam configuration in RRC_CONNECTED mode.

A UE receives a CSI-ResourceConfig information element (IE) including CSI-SSB-ResourceSetList for SSB resources used for BM from a BS (S1710). The RRC parameter, CSI-SSB-ResourceSetList is a list of SSB resources used for BM and reporting in one resource set. The SSB resource set may be configured as {SSBx 1, SSBx2, SSBx3, SSBx4}. SSB indexes may range from 0 to 63.

The UE receives signals in the SSB resources from the BS based on CSI-SSB-ResourceSetList (S1720).

When CSI-RS reportConfig related to an SSBRI and RSRP reporting has been configured, the UE reports a best SSBRI and an RSRP corresponding to the best SSBRI to the BS (S1730). For example, when reportQuantity in the CSI-RS reportConfig IE is set to 'ssb-Index-RSRP', the UE reports the best SSBRI and the RSRP corresponding to the best SSBRI to the BS.

When CSI-RS resources are configured in OFDM symbol(s) carrying an SSB and 'QCL-TypeD' is applicable to the CSI-RS resources and the SSB, the UE may assume that a CSI-RS and the SSB are quasi-co-located (QCLed) from the perspective of 'QCL-TypeD'. QCL-TypeD may mean that antenna ports are QCLed from the perspective of spatial Rx parameters. When the UE receives signals from a plurality of DL antenna ports placed in the QCL-TypeD relationship, the UE may apply the same Rx beam to the signals.

2. DL BM Using CSI-RS

The CSI-RS serves the following purposes: i) when Repetition is configured and TRS_info is not configured for a specific CSI-RS resource set, the CSI-RS is used for BM; ii) when Repetition is not configured and TRS_info is configured for the specific CSI-RS resource set, the CSI-RS is used for a tracking reference signal (TRS); and iii) when either of Repetition or TRS_info is configured for the specific CSI-RS resource set, the CSI-RS is used for CSI acquisition.

When (the RRC parameter) Repetition is set to 'ON', this is related to the Rx beam sweeping process of the UE. In the case where Repetition is set to 'ON', when the UE is configured with NZP-CSI-RS-ResourceSet, the UE may assume that signals in at least one CSI-RS resource within NZP-CSI-RS-ResourceSet are transmitted through the same DL spatial domain filter. That is, the at least one CSI-RS resource within NZP-CSI-RS-ResourceSet is transmitted on the same Tx beam. The signals in the at least one CSI-RS resource within NZP-CSI-RS-ResourceSet may be transmitted in different OFDM symbols.

On the contrary, when Repetition is set to 'OFF', this is related to the Tx beam sweeping process of the BS. In the case where Repetition is set to 'OFF', the UE does not assume that signals in at least one CSI-RS resource within NZP-CSI-RS-ResourceSet are transmitted through the same DL spatial domain filter. That is, the signals in the at least one CSI-RS resource within NZP-CSI-RS-ResourceSet are transmitted on different Tx beams. FIG. 12 illustrates another exemplary DL BM process using a CSI-RS.

FIG. 18(a) illustrates an Rx beam refinement process of a UE, and FIG. 18(b) illustrates a Tx beam sweeping process of a BS. Further, FIG. 18(a) is for a case in which Repetition is set to 'ON', and FIG. 18(b) is for a case in which Repetition is set to 'OFF'.

With reference to FIGS. 18(a) and 19(a), an Rx beam determination process of a UE will be described below.

FIG. 19(a) is a diagram illustrating a signal flow for an exemplary Rx beam determination process of a UE.

The UE receives an NZP CSI-RS resource set IE including an RRC parameter 'Repetition' from a BS by RRC signaling (S1910). The RRC parameter 'Repetition' is set to 'ON' herein.

The UE repeatedly receives signals in resource(s) of a CSI-RS resource set for which the RRC parameter 'Repetition' is set to 'ON' on the same Tx beam (or DL spatial domain Tx filter) of the BS in different OFDM symbols (S1920).

The UE determines its Rx beam (S1930).

The UE skips CSI reporting (S1940). That is, the UE may skip CSI reporting, when the RRC parameter 'Repetition' is set to 'ON'.

With reference to FIGS. 18(b) and 19(b), a Tx beam determination process of a BS will be described below.

FIG. 19(b) is a diagram illustrating an exemplary Tx beam determination process of a BS.

A UE receives an NZP CSI-RS resource set IE including an RRC parameter 'Repetition' from the BS by RRC signaling (S1950). When the RRC parameter 'Repetition' is set to 'OFF', this is related to a Tx beam sweeping process of the BS.

The UE receives signals in resource(s) of a CSI-RS resource set for which the RRC parameter 'Repetition' is set to 'OFF' on different Tx beams (or DL spatial domain Tx filters) of the BS (S1960).

The UE selects (or determines) a best beam (S1970).

The UE reports the ID (e.g., CRI) of the selected beam and related quality information (e.g., an RSRP) to the BS (S1980). That is, the UE reports a CRI and an RSRP corresponding to the CRI, when a CSI-RS is transmitted for BM.

Figure 18:
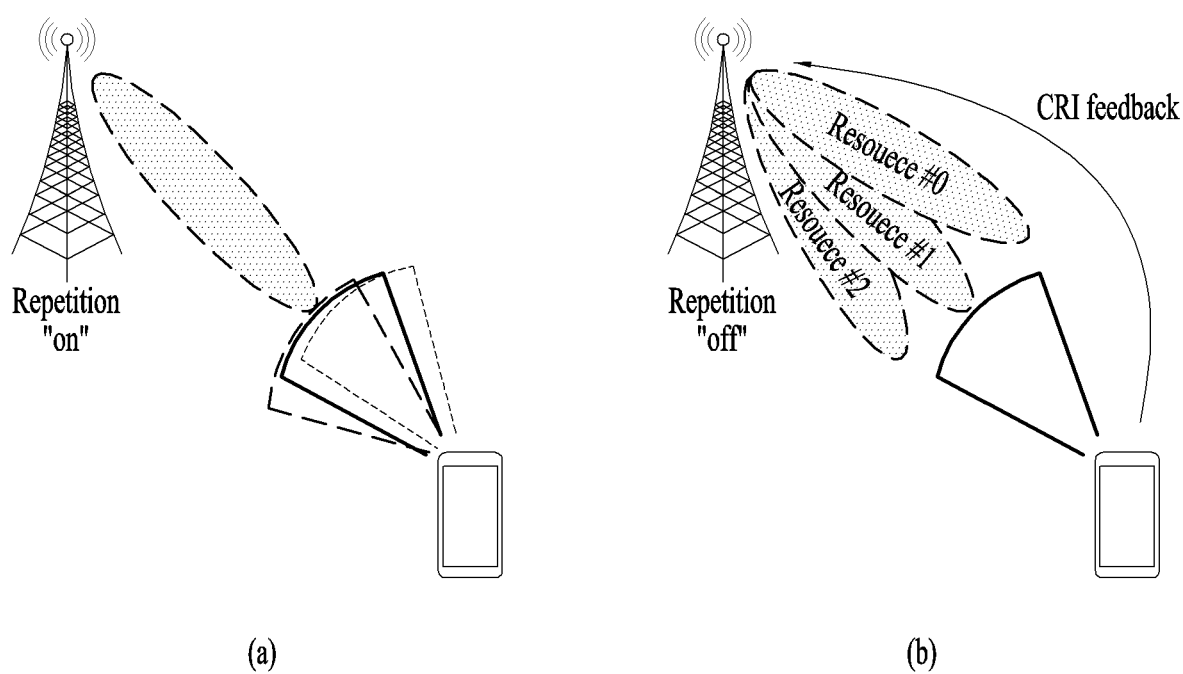
Figure 20:
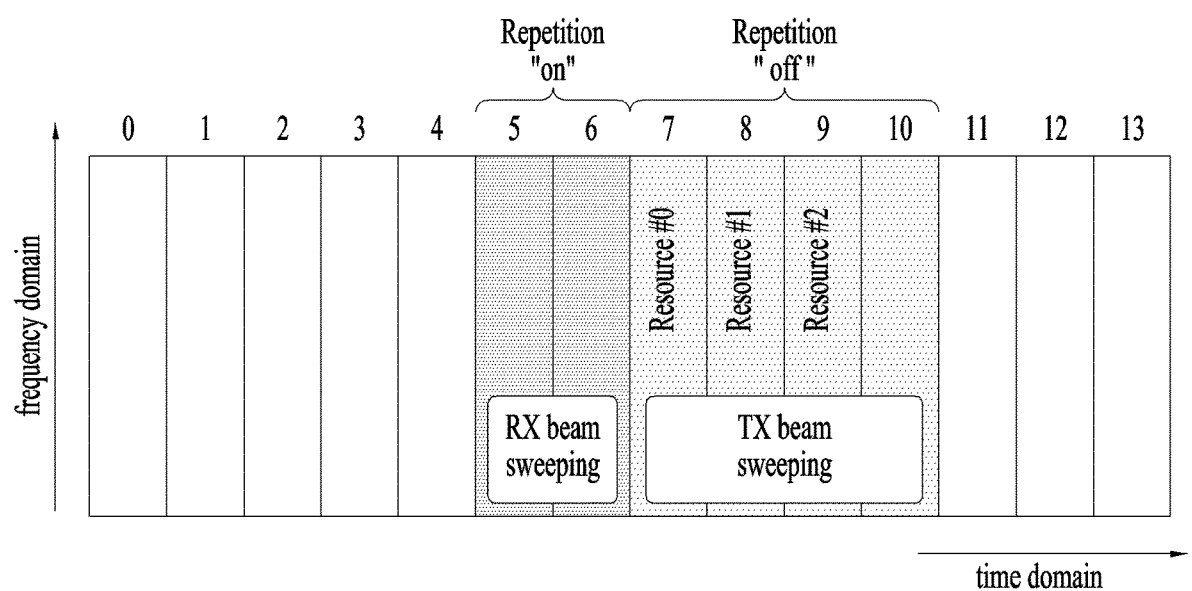

FIG. 20 is a diagram illustrating exemplary resource allocation in the time and frequency domains, which is related to the operation of FIG. 18.

When Repetition is set to 'ON' for a CSI-RS resource set, a plurality of CSI-RS resources may be repeatedly used on the same Tx beam, whereas when Repetition is set to 'OFF' for the CSI-RS resource set, different CSI-RS resources may be repeatedly transmitted on different Tx beams.

3. DL BM-Related Beam Indication

The UE may receive at least a list of up to M candidate transmission configuration indication (TCI) states for QCL indication by RRC signaling. M depends on a UE capability and may be 64.

Each TCI state may be configured with one RS set. Table 8 describes an example of a TCI-State IE. The TC-State IE is related to a QCL type corresponding to one or two DL RS s.

TABLE 8

```
-- ASN1START
-- TAG-TCI-STATE-START
   TCI-State ::=           SEQUENCE {
      tci-StateId              TCI-StateId,
      qcl-Type1                QCL-Info,
      qcl-Type2                QCL-Info                    OPTIONAL, -- Need R
      ...
   }
      QCL-Info ::=         SEQUENCE {
         cell                  ServCellIndex               OPTIONAL, -- Need R
         bwp-Id                BWP-Id                      OPTIONAL, -- Cond CSI-RS-Indicated
         referenceSignal       CHOICE {
            csi-rs                NZP-CSI-RS-ResourceId,
            ssb                   SSB-Index
         },
         qcl-Type              ENUMERATED {typeA, typeB, typeC, typeD},
         ...
      }
-- TAG-TCI-STATE-STOP
-- ASN1STOP
```

In Table 8, 'bwp-Id' identifies a DL BWP in which an RS is located, 'cell' indicates a carrier in which the RS is located, and 'referencesignal' indicates reference antenna port(s) serving as a QCL source for target antenna port(s) or an RS including the reference antenna port(s). The target antenna port(s) may be for a CSI-RS, PDCCH DMRS, or PDSCH DMRS.

4. Quasi-Co Location (QCL)

The UE may receive a list of up to M TCI-State configurations to decode a PDSCH according to a detected PDCCH carrying DCI intended for a given cell. M depends on a UE capability.

As described in Table 5, each TCI-State includes a parameter for establishing the QCL relationship between one or more DL RSs and a PDSCH DM-RS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is for a specific NZP CSI-RS, the NZP CSI-RS antenna port may be indicated/configured as QCLed with a specific TRS from the perspective of QCL-Type A and with a specific SSB from the perspective of QCL-Type D. Upon receipt of this indication/ configuration, the UE may receive the NZP CSI-RS using a Doppler value and a delay value which are measured in a QCL-TypeA TRS, and apply an Rx beam used to receive a QCL-Type D SSB for reception of the NZP CSI-RS.

CSI-Related Operations

In the NR system, a CSI-RS is used for time/frequency tracking, CSI computation, reference signal received power (RSRP) calculation, and mobility. CSI computation is related to CSI acquisition, and RSRP computation is related to beam management (BM).

Figure 21:
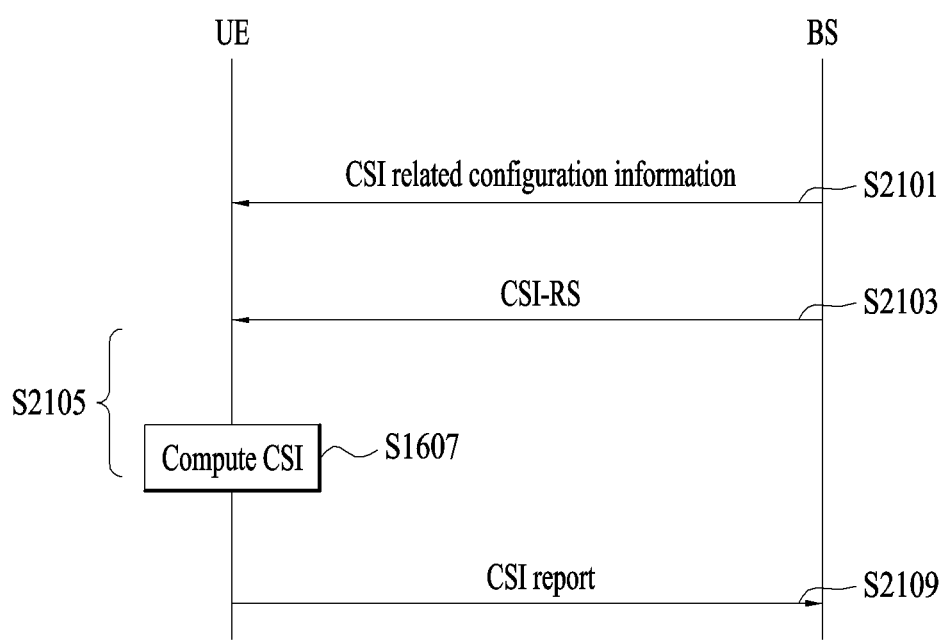
FIG. 21 is a diagram illustrating a signal flow for channel state information (CSI) reporting

FIG. 21 is a diagram illustrating a signal flow for a CSI-related process.

For one of the above-described uses of the CSI-RS, a UE receives CSI-related configuration information from a BS by RRC signaling (S2101).

The CSI-related configuration information may include at least one of channel state information interference measurement (CSI-IM) resource-related information, CSI measurement configuration-related information, CSI resource configuration-related information, CSI-RS resource-related information, or CSI report configuration-related information.

i) The CSI-IM resource-related information may include CSI-IM resource information, CSI-IM resource set information, and so on. A CSI-IM resource set is identified by a CSI-IM resource set ID, and one CSI-IM resource set includes at least one CSI-IM resource. Each CSI-IM resource is identified by a CSI-IM resource ID.

ii) The CSI resource configuration-related information may be represented by a CSI-ResourceConfig information element (IE). The CSI resource configuration-related information defines a group including at least one of a non-zero power (NZP) CSI-RS resource set, a CSI-IM resource set, or a CSI-SSB resource set. That is, the CSI resource configuration-related information may include a CSI-RS resource set list, and the CSI-RS resource set list may include at least one of an NZP CSI-RS resource set list, a CSI-IM resource set list, or a CSI-SSB resource set list. The CSI-RS resource set is identified by a CSI-RS resource set ID, and one CSI-RS resource set includes at least one CSI-RS resource. Each CSI-RS resource is identified by a CSI-RS resource ID.

An RRC parameter indicating the use of a CSI-RS (e.g., a BM-related parameter 'repetition' and a tracking-related parameter 'trs-Info') may be configured for each NZP CSI-RS resource set.

iii) The CSI report configuration-related information includes a parameter indicating a time-domain behavior, reportConfigType and a parameter indicating a CSI-related quantity to be reported, reportQuantity. The time-domain behavior may be periodic, aperiodic, or semi-persistent.

The UE measures CSI based on the CSI-related configuration information (S2105). The CSI measurement may include (1) CSI-RS reception of the UE (S2103) and (2) CSI computation in the received CSI-RS (S2107). Mapping of the CSI-RS to REs of CSI-RS resources in the time and frequency domains is configured by an RRC parameter, CSI-RS-ResourceMapping.

The UE reports the measured CSI to the BS (S2109).

1. CSI Measurement

The NR system supports more flexible and more dynamic CSI measurement and reporting. The CSI measurement may include reception of a CSI-RS and measurement of the received CSI-RS to acquire CSI.

As the time-domain behavior of CSI measurement and reporting, channel measurement (CM) and interference measurement (IM) are supported.

A CSI-IM-based IM resource (IMR) is designed in NR, similarly to a CSI-IM in LTE and configured independently of a zero power (ZP) CSI-RS resource for PDSCH rate matching.

The BS transmits an NZP CSI-RS to the UE on each port of a configured NZP CSI-RS-based IMR.

When there is no PMI and RI feedback for a channel, multiple resources are configured in a set, and the BS or network indicates a subset of NZP CSI-RS resources for channel measurement and/or interference measurement by DCI.

A resource setting and a resource setting configuration will be described in greater detail.

1.1. Resource Setting

Each CSI resource setting 'CSI-ResourceConfig' includes a configuration of S≥1 CSI resource sets (given by an RRC parameter csi-RS-ResourceSetList). S represents the number of configured CSI-RS resource sets. The configuration of S≥1 CSI resource sets includes each CSI resource set including (NZP CSI-RS or CSI-IM) CSI-RS resources, and SSB resources used for RSRP computation.

Each CSI resource setting is located in a DL BWP identified by an RRC parameter bwp-id. All CSI resource settings linked to a CSI reporting setting have the same DL BWP.

The time-domain behavior of a CSI-RS resource within the CSI-ResourceConfig IE is indicated by an RRC parameter resourceType in the CSI resource setting, and may be set to aperiodic, periodic, or semi-persistent.

One or more CSI resource settings for channel measurement and interference measurement are configured by RRC signaling. A channel measurement resource (CMR) may be an NZP CSI-RS for CSI acquisition, and an IMR may be an NZP CSI-RS for CSI-IM and IM. The CSI-IM (or ZP CSI-RS for IM) is mainly used for inter-cell measurement. The NZP CSI-RS for IM is used mainly for measurement of intra-cell interference from multiple users.

The UE may assume that CSI-RS resource(s) for channel measurement and CSI-IM/NZP CSI-RS resource(s) for interference measurement configured for one CSI report are resource-wise quasi co-located (QCLed) with respect to 'QCL-TypeD'.

1.2. Resource Setting Configuration

A resource setting may mean a resource set list, and one reporting setting may be linked to up to three resource settings.

When one resource setting is configured, the resource setting (given by an RRC parameter resourcesForChannelMeasurement) is for channel measurement for RSRP computation.

When two resource settings are configured, the first resource setting (given by the RRC parameter resourcesForChannelMeasurement) is for channel measurement and the second resource setting (given by csi-IM-ResourcesForInterference or nzp-CSI-RS-ResourcesForInterference) is for interference measurement on the CSI-IM or on the NZP CSI-RS.

When three resource settings are configured, the first resource setting (given by resourcesForChannelMeasurement) is for channel measurement, the second resource setting (given by csi-IM-ResourcesForInterference) is for CSI-IM-based interference measurement, and the third resource setting (given by nzp-CSI-RS-ResourcesForInterference) is for NZP CSI-RS-based interference measurement.

When one resource setting (given by resourcesForChannelMeasurement) is configured, the resource setting is for channel measurement for RSRP computation.

When two resource settings are configured, the first resource setting (given by resourcesForChannelMeasurement) is for channel measurement and the second resource setting (given by the RRC parameter csi-IM-ResourcesForInterference) is used for interference measurement performed on the CSI-IM.

1.3. CSI Computation

If interference measurement is performed on the CSI-IM, each CSI-RS resource for channel measurement is resource-wise associated with a CSI-IM resource by the ordering of the CSI-RS resources and CSI-IM resources in a corresponding resource set. The number of CSI-RS resources for channel measurement equals to the number of CSI-IM resources.

For CSI measurement, the UE assumes the following.
Each NZP CSI-RS port configured for interference measurement corresponds to an interference transmission layer.
All interference transmission layers on NZP CSI-RS ports for interference measurement take into account energy per resource element (EPRE) ratios.
The UE assumes another interference signal on RE(s) of NZP CSI-RS resources for channel measurement, NZP CSI-RS resources for interference measurement, or CSI-IM resources for interference measurement.

2. CSI Reporting

Time and frequency resources available for the UE to report CSI are controlled by the BS.

For a CQI, a PMI, a CSI-RS resource indicator (CRI), an SSB resource indicator (SSBRI), a layer indicator (LI), an RI, and an RSRP, the UE receives RRC signaling including N≥1 CSI-ReportConfig reporting settings, M≥1 CSI-ResourceConfig resource settings, and one or two lists of trigger states (given by aperiodicTriggerStateList and semiPersistentOnPUSCH-TriggerStateList). Each trigger state in aperiodicTriggerStateList includes a list of associated CSI-ReportConfigs indicating resource set IDs for a channel and optionally for interference. Each trigger state in semiPersistentOnPUSCH-TriggerStateList contains one associated CSI-ReportConfig That is, the UE transmits a CSI report indicated by CSI-ReportConfigs associated with a corresponding CSI-RS resource setting to the BS. For example, the UE may report at least one of a CQI, a PMI, a CRI, an SSBRI, an LI, an RI, or an RSRP as indicated by CSI-ReportConfigs associated with the CSI resource setting. However, if CSI-ReportConfigs associated with the CSI resource setting indicates 'none', the UE may not report CSI or an RSRP associated with the CSI resource setting. The CSI resource setting may indicate resources for an SS/PBCH block.

Figure 22:
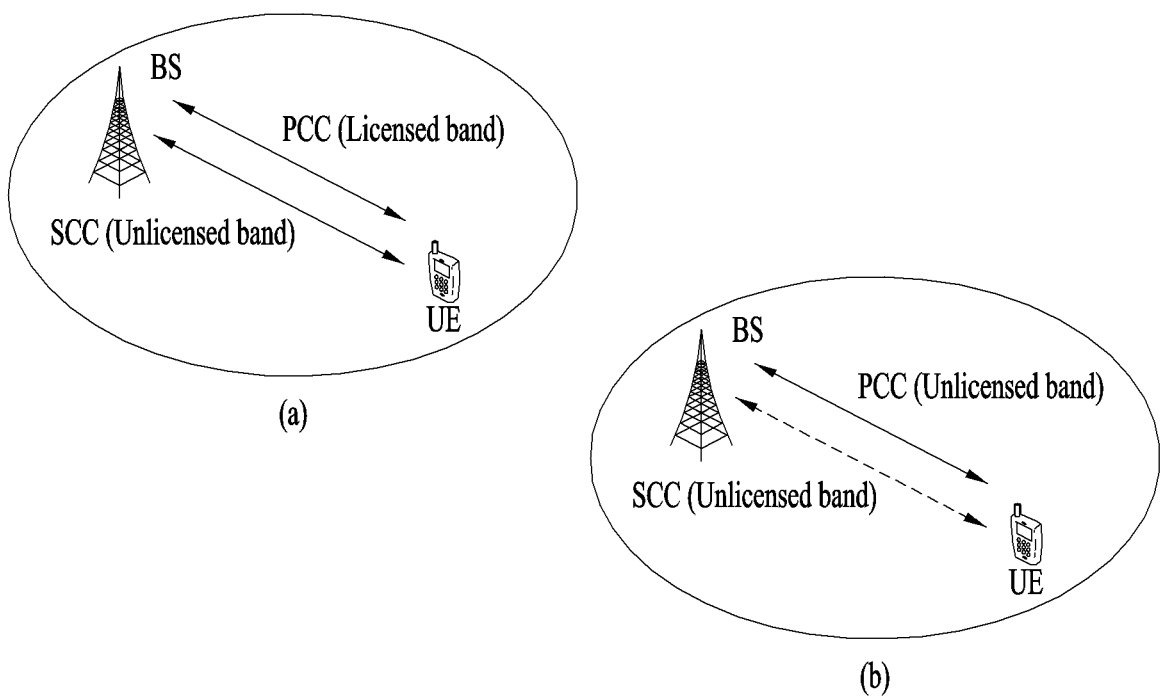
FIGS. 22 to 24 are diagrams illustrating downlink and uplink transmission in an unlicensed band.

FIG. 22 illustrates an exemplary wireless communication system supporting an unlicensed band, which is applicable to the present disclosure.

In the following description, a cell operating in a licensed band (hereinafter, referred to as an L-band) is defined as an L-cell, and the carrier of an L-cell is defined as a (DL/UL) LCC. Further, a cell operating in an unlicensed band (hereinafter, referred to as a U-band) is defined as a U-cell and the carrier of a U-cell is defined as a (DL/UL) UCC. The carrier/carrier-frequency of a cell may refer to the operating frequency (e.g., center frequency) of the cell. A cell/carrier (e.g., component carrier (CC)) is genetically referred to as a cell.

When a UE and a BS transmit and receive signals in a carrier-aggregated LCC and UCC as illustrated in FIG. 22(a), the LCC may be configured as a primary CC (PCC) and the UCC may be configured as a secondary CC (SCC). As illustrated in FIG. 22(b), the UE and the BS may transmit and receive signals in one UCC or a plurality of carrier-aggregated UCCs. That is, the UE and the BS may transmit and receive signals only in UCC(s) without an LCC.

A signal transmission/reception operation in an unlicensed band described in the present disclosure may be performed based on all the above-described deployment scenarios (unless otherwise specified).

Figure 27:
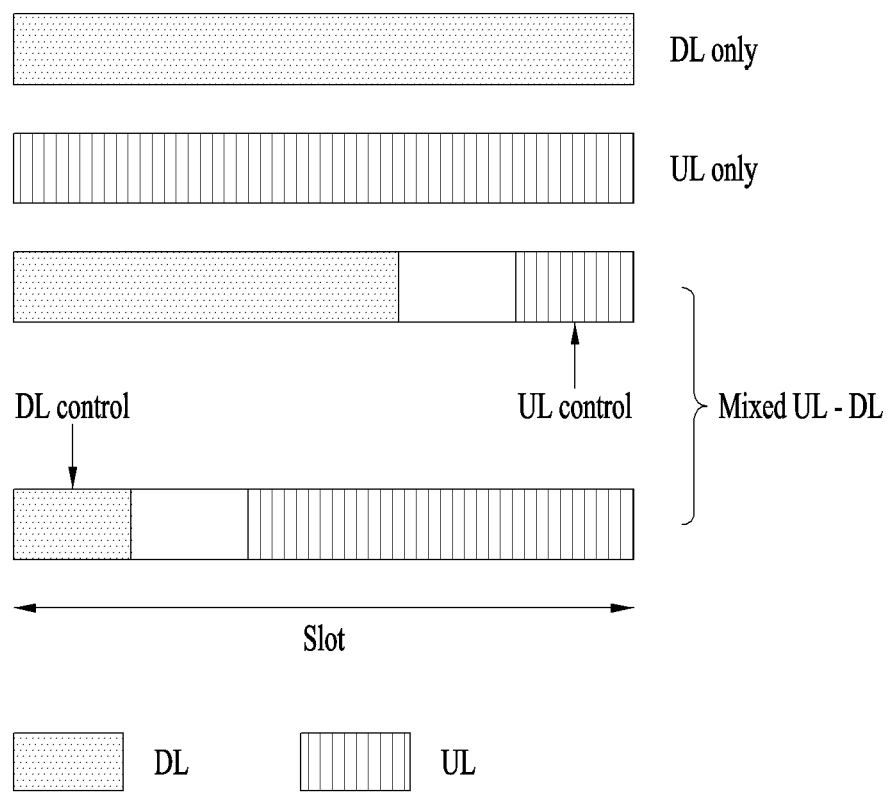

The NR frame structure of FIG. 27 may be used for an operation in an unlicensed band. The configuration of OFDM symbols occupied for UL/DL signal transmission in the frame structure for the unlicensed band may be configured by the BS. The term OFDM symbol may be replaced with SC-FDM(A) symbol.

To transmit a DL signal in an unlicensed band, the BS may indicate the configuration of OFDM symbols used in subframe #n to the UE by signaling. The term subframe may be replaced with slot or time unit (TU).

Specifically, in an LTE system supporting an unlicensed band, the UE may assume (or identify) the configuration of OFDM symbols occupied in subframe #n by a specific field (e.g., a Subframe configuration for LAA field or the like) in DCI received in subframe #n−1 or subframe #n from the BS.

Table 9 describes a method of indicating the configuration of OFDM symbols used for transmission of a DL physical channel and/or physical signal in a current and/or next subframe by the Subframe configuration for LAA field in the LTE system.

TABLE 9

| Value of 'Subframe configuration for LAA' field in current subframe | Configuration of occupied OFDM symbols (current subframe, next subframe) |
| --- | --- |
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
- (—, Y) means UE may assume the first Y symbols are occupied in next subframe and other symbols in the next subframe are not occupied.
- (X, —) means UE may assume the first X symbols are occupied in current subframe and other symbols in the current subframe are not occupied.
- (X, *) means UE may assume the first X symbols are occupied in current subframe, and at least the first OFDM symbol of the next subframe is not occupied.

For UL signal transmission in an unlicensed band, the BS may indicate a UL transmission period to the UE by signaling.

Specifically in the LTE system supporting an unlicensed band, the UE may obtain 'UL duration' and 'UL offset' information for subframe #n from a 'UL duration and offset' field in detected DCI.

Table 10 illustrates a method of indicating the configuration of a UL offset and a UL duration by the UL duration and offset field in the LTE system.

TABLE 10

| Value of 'UL duration and offset' field | UL offset, l (in subframes) | UL duration, d (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, if the UL duration and offset field configures (or indicates) UL offset 1 and UL duration d for subframe #n, the UE does not need to receive a DL physical channel and/or physical signal in subframe #(n+1+i) (where i=0, 1, . . . , d−1).

The BS may perform one of the following unlicensed band access procedures (e.g., channel access procedures (CAPs)) to transmit a DL signal in the unlicensed band.

(1) First DL CAP Method

Figure 23:
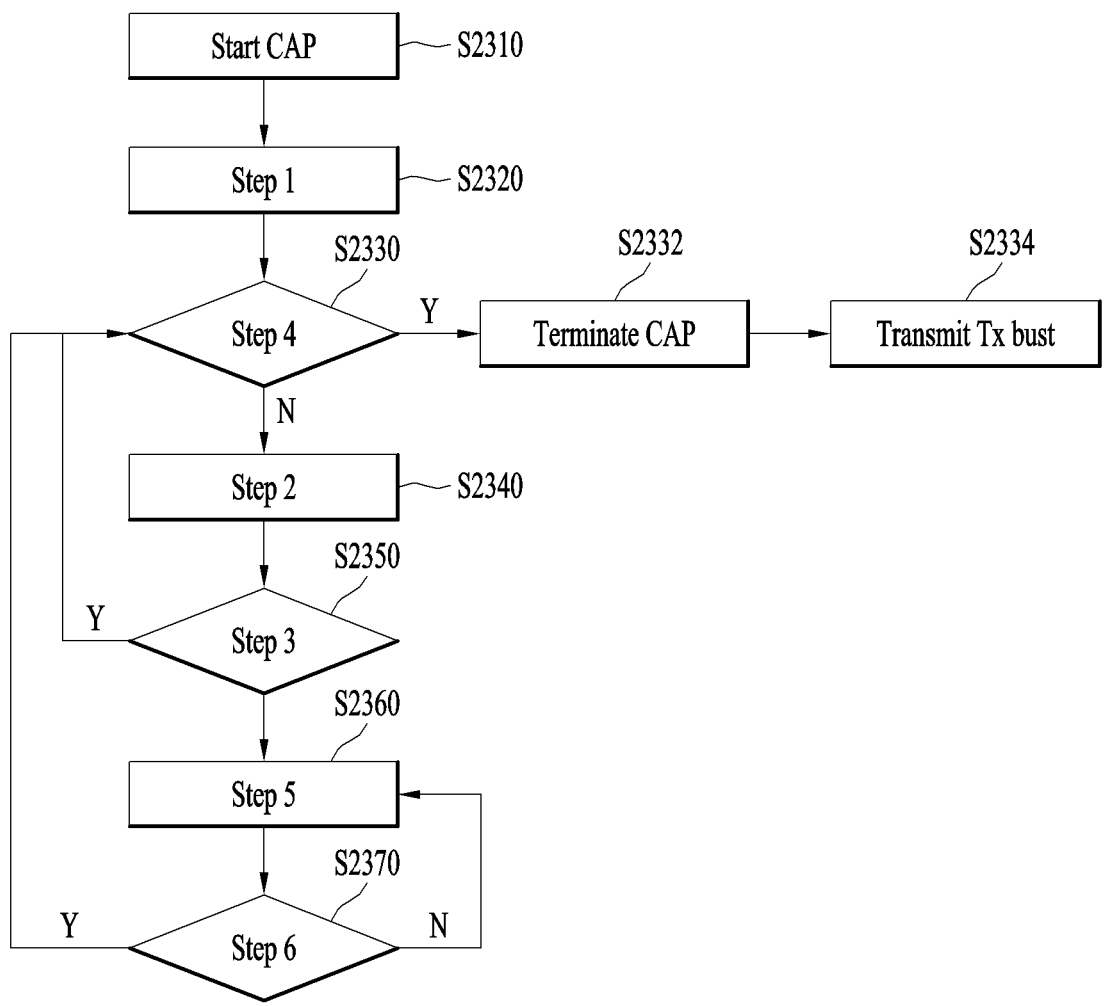

FIG. 23 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S2310). The BS may randomly select a backoff counter N within a contention window (CW) according to step 1. N is set to an initial value $N_{init}$ (S2320). $N_{init}$ is a random value selected from the values between 0 and $CW_p$. Subsequently, when the backoff counter value N is 0 according to step 4 (S2330; Y), the BS terminates the CAP (S2332). The BS may then perform a Tx burst transmission including transmission of a PDSCH/PDCCH/EPDCCH (S2334). On the contrary, when the backoff counter value N is not 0 (S2330; N), the BS decrements the backoff counter value by 1 according to step 2 (S2340). Subsequently, the BS checks whether the channel of U-cell(s) is idle (S2350). If the channel is idle (S2350; Y), the BS determines whether the backoff counter value is 0 (S2330). On the contrary, when the channel is not idle, that is, the channel is busy (S2350; N), the BS determines whether the channel is idle during a longer defer duration $T_d$ (25 usec or longer) than a slot duration (e.g., 9 usec) according to step 5 (S2360). If the channel is idle during the defer duration (S2370; Y), the BS may resume the CAP. The defer duration may include a 16-usec duration and the immediately following $m_p$ consecutive slot durations (e.g., each being 9 usec). On the contrary, if the channel is busy during the defer duration (S2370; N), the BS re-checks whether the channel of the U-cell(s) is idle during a new defer duration by performing step S2360 again.

Table 11 illustrates that $m_p$, a minimum CW, a maximum CW, a maximum channel occupancy time (MCOT), and an allowed CW size applied to a CAP vary among channel access priority classes.

TABLE 11

| Channel Access Priority Class (p) | $m_p$ | $CW_{min,p}$ | $CW_{max,p}$ | $T_{ulcot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}$=25 us. $T_{drs}$ includes a duration $T_f$ (=16 us) following one slot duration $T_{sl}$ (=9 us).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining $N_{init}$ for a specific carrier.

Further, the UE performs a contention-based CAP for a UL signal transmission in an unlicensed band. The UE performs a Type 1 or Type 2 CAP for the UL signal transmission in the unlicensed band. In general, the UE may perform a CAP (e.g., Type 1 or Type 2) configured for a UL signal transmission by the BS.

(1) Type 1 UL CAP Method

Figure 24:
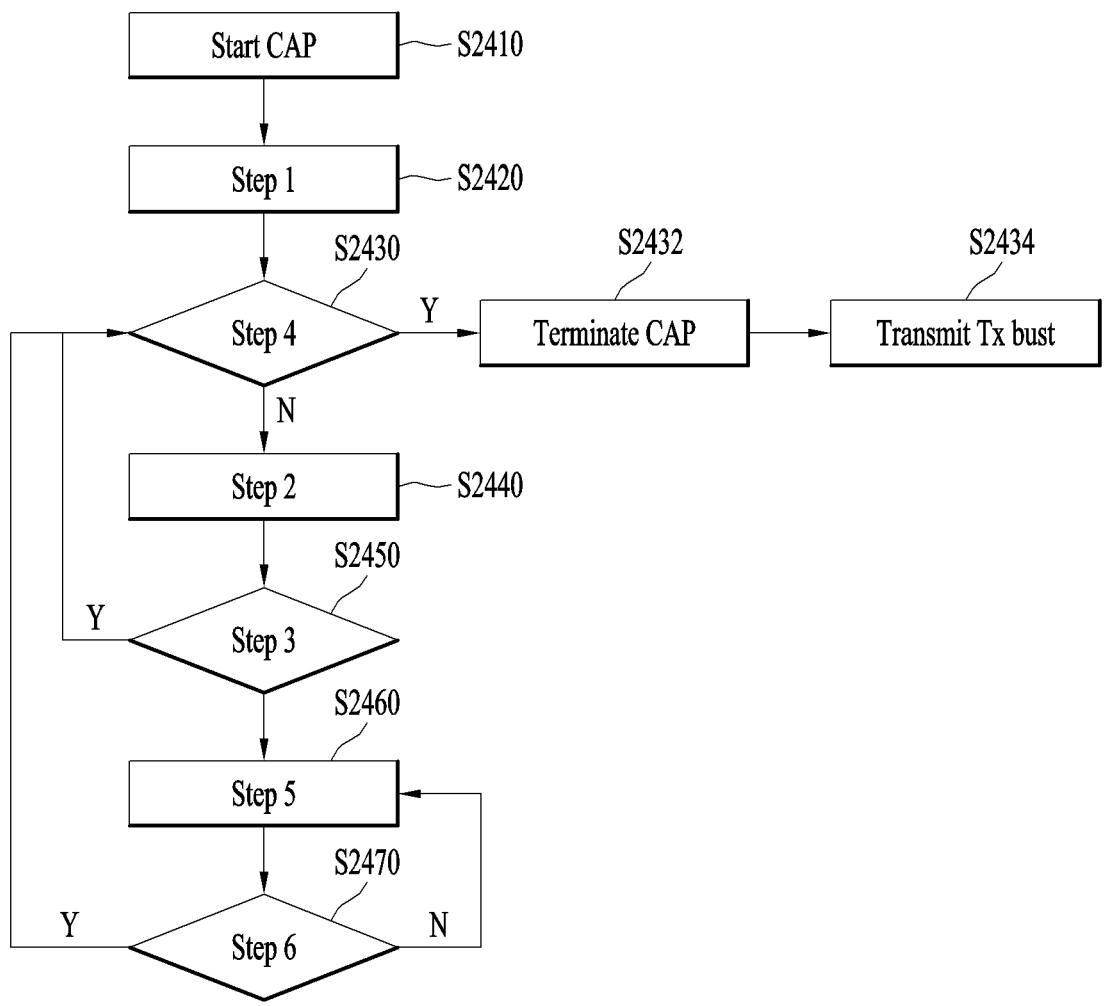

FIG. 24 is a flowchart illustrating UE's Type 1 CAP operation for UL signal transmission.

To transmit a signal in the U-band, the UE may initiate a CAP (S2410). The UE may randomly select a backoff counter N within a contention window (CW) according to step 1. In this case, N is set to an initial value $N_{init}$ (S820). $N_{init}$ may have a random value between 0 and $CW_p$. If it is determined according to step 4 that the backoff counter value (N) is 0 (YES in S2430), the UE terminates the CAP (S2432). Then, the UE may perform Tx burst transmission (S2434). If the backoff counter value is non-zero (NO in S2430), the UE decreases the backoff counter value by 1 according to step 2 (S2440). The UE checks whether the channel of U-cell(s) is idle (S2450). If the channel is idle (YES in S2450), the UE checks whether the backoff counter value is 0 (S2430). On the contrary, if the channel is not idle in S2450, that is, if the channel is busy (NO in S2450), the UE checks whether the corresponding channel is idle for a defer duration $T_d$ (longer than or equal to 25 usec), which is longer than a slot duration (e.g., 9 usec), according to step 5 (S2460). If the channel is idle for the defer duration (YES in S2470), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S2470), the UE performs step S2460 again to check whether the channel is idle for a new defer duration.

Table 12 shows that the values of $m_p$, a minimum CW, a maximum CW, an MCOT, and allowed CW sizes, which are applied to the CAP, vary depending on channel access priority classes.

TABLE 12

| $m_p$ | $CW_{min,p}$ | $CW_{max,p}$ | $T_{ulm\,cot,p}$ | allowed $CW_p$ sizes |
|---|---|---|---|---|
| 2 | 3 | 7 | 2 ms | {3, 7} |
| 2 | 7 | 15 | 4 ms | {7, 15} |
| 3 | 15 | 1023 | 6 ms or 10 ms | {15, 31, 63, 127, 255, 511, 1023} |
| 7 | 15 | 1023 | 6 ms or 10 ms | {15, 31, 63, 127, 255, 511, 1023} |

NOTE1:
For p = 3, 4, $T_{ulm\,cot,p}$ = 10 ms if the higher layer parameter 'absenceOfAnyOtherTechnology-r14' indicates TRUE, otherwise, $T_{ulm\,cot,p}$ = 6 ms.
NOTE 2:
When $T_{ulm\,cot,p}$ = 6 ms it may be increased to 8 ms by inserting one or more gaps. The minimum duration of a gap shall be 100 μs. The maximum duration before including any such gap shall be 6 ms.

The size of a CW applied to the Type 1 UL CAP may be determined in various ways. For example, the CW size may be adjusted depending on whether the value of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min,p}$ for every priority class p∈{1, 2, 3, 4}. Otherwise, the UE may increase $CW_p$ for every priority class p∈{1, 2, 3, 4} to a next higher allowed value.

A reference subframe (or reference slot) $n_{ref}$ may be determined as follows.

When the UE receives a UL grant in a subframe (or slot) $n_g$ and performs transmission including a UL-SCH, which has no gaps and starts from a subframe (or slot) no, in subframes (or slots) $n_0, n_1, \ldots, n_w$ (where the subframe (or slot) $n_w$ is the most recent subframe (or slot) before a subframe $n_g$−3 in which the UE has transmitted the UL-SCH based on the Type 1 CAP), the reference subframe (or slot) $n_{ref}$ may be the subframe no.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

FIG. 25 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

Table 13 illustrates that the number of symbols per slot, the number of slots per frame, and the number of slots per subframe vary according to the SCS when the normal CP is used.

TABLE 13

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe Table 14 illustrates that the number of symbols per slot, the number of slots per frame, and the number of slots per subframe vary according to the SCS when the extended CP is used.

TABLE 14

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

Figure 26:
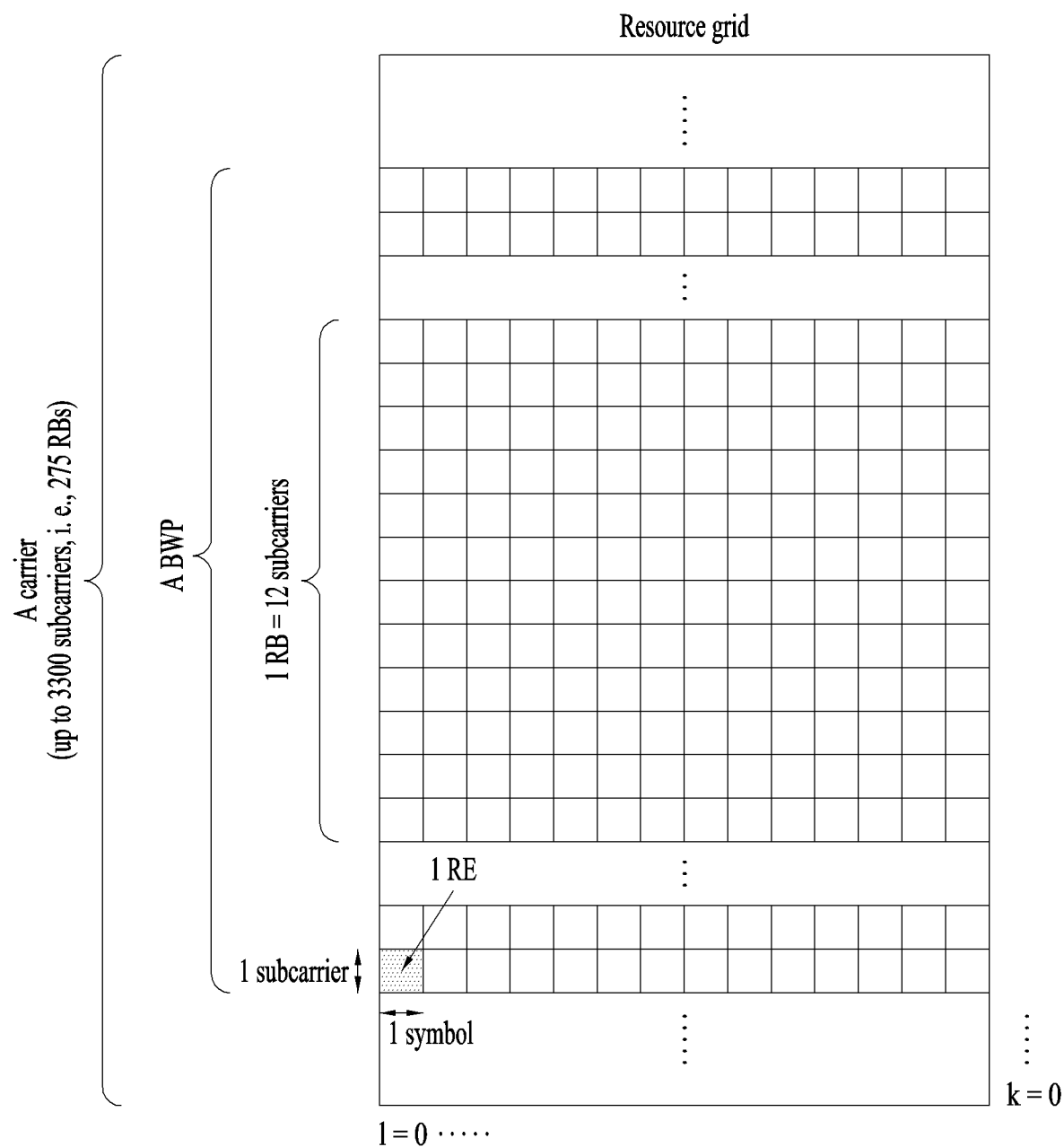

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells. FIG. 26 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., 4) BWPs. Data communication is performed through an activated BWP, and only one BWP may be activated for one UE. In the resource grid, each element is referred to as a resource element (RE), and one complex symbol may be mapped thereto.

FIG. 27 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

In NR, CSI-RS may be configured for various purposes. Representative purposes include beam management-reference signal (BM-RS), beam failure detection RS (BFD-RS), and tracking reference signal (TRS), radio resource management (RRM)-RS, radio link monitoring (RLM), and CSI acquisition.

For the reasons given above, the CSI-RS is designed to have a flexible configuration. In addition, since the system bandwidth and a bandwidth part (BWP) set for each terminal support bands from a narrow band of about 5 MHz to a wideband of 100 MH or more, a wideband CSI-RS may be configured according to an operating environment. In particular, since the CSI-RS is defined as a signal for measuring the quality of a channel, the channel characteristics of the entire bands may be acquired by transmitting the CSI-RS over all frequency bands occupied by the terminal.

However, when an NR system (hereinafter referred to as "NR-U") is operated in an unlicensed band operated by a single operator, the NR-U system operated by the operator may be operated together with another system such as Wi-Fi or a licensed assisted access (LAA) system or NR-U system operated by other operators in the same band, in contrast with the licensed band. To this end, a system operated in the unlicensed band performs a channel clearance assessment (CCA) operation of determining whether a channel to transmit a signal is occupied by another system before signal transmission for the coexistence of systems.

That is, the signal is transmitted only when it is determined that the frequency band in which the signal is to be transmitted through the CCA is idle. For the CCA for the wideband CSI-RS, it may be basically considered to use the RLM-RS to determine whether a channel is busy/idle in the entire system band.

Figure 28:
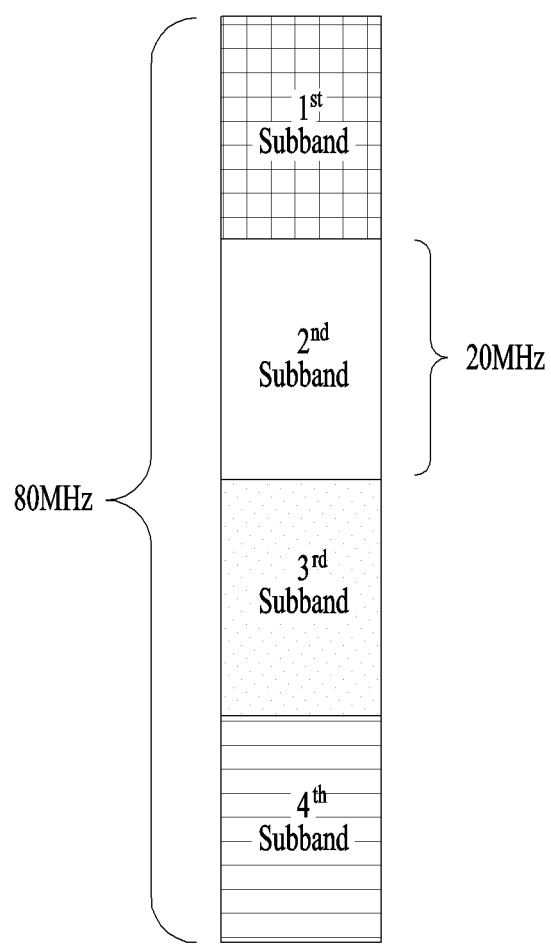
FIG. 28 is a diagram illustrating an implementation example of clear channel assessment (CCA) in an unlicensed band according to the present disclosure.

However, in general, the frequency band considered to be used in the NR-U system may be larger than the basic frequency band used by an existing system such as Wi-Fi. For example, as can be seen from FIG. 28, when the frequency band of the unlicensed band in which the NR system is operated is 80 MHz, while a system such as Wi-Fi or LAA is operating in units of 20 MHz, the probability that the channel is determined to be busy due to the CCA operation is performed for 80 MHz. may be significantly increased. In particular, for a periodically transmitted signal, when the probability that the channel is busy increases, the probability that the transmission will fail in a time period allocated for transmission may increase.

When the channel or signal to be transmitted is set to a broader band than the LBT sub-band (for example, a sub-band set to a 20 MHz band), transmitting the channel only for the LBT sub-band in which the channel is determined to be idle may be discussed based on a data channel.

However, in the case of a signal for measuring channel quality such as a CSI-RS, when the CSI-RS is transmitted through a partial band, channel information may not be valid for the entire frequency band. For example, in FIG. 28, even when the CSI-RS is transmitted through the 2nd sub-band, the channel quality measured based on the CSI-RS may not be valid in the entire 80 MHz band.

Here, when the CSI-RS is used as a BM-RS, BFD-RS, RRM-RS, or RLM-RS, at least one sub-band may be considered effective as a value representing the entire frequency band. However, for the CSI, it may not be allowed to set a data rate of a data channel transmitted in the entire frequency band based on information on a part of the entire frequency band. In addition, when the channel quality of the entire frequency band is reported without determining whether the CSI-RS is transmitted, the user throughput may be rapidly degraded due to the incorrect use of the channel quality.

Considering these characteristics, the present disclosure proposes a method for efficiently transmitting, measuring, and reporting a CSI-RS when a system band or BWP band having a frequency band wider than the frequency band for CCA (hereinafter referred to as "LBT sub-band") is set.

Figure 29:
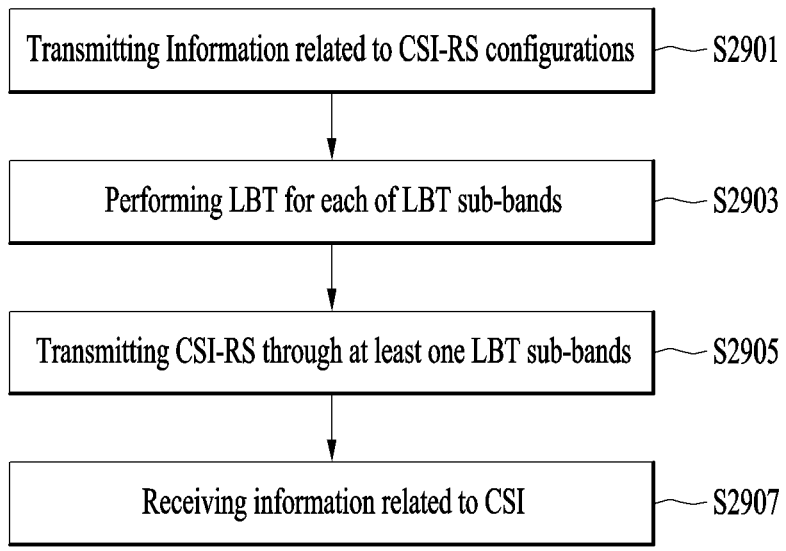
FIGS. 29 to 31 are diagrams illustrating an implementation example of operations of a terminal, a base station, and a network according to an embodiment of the present disclosure.
Figure 30:
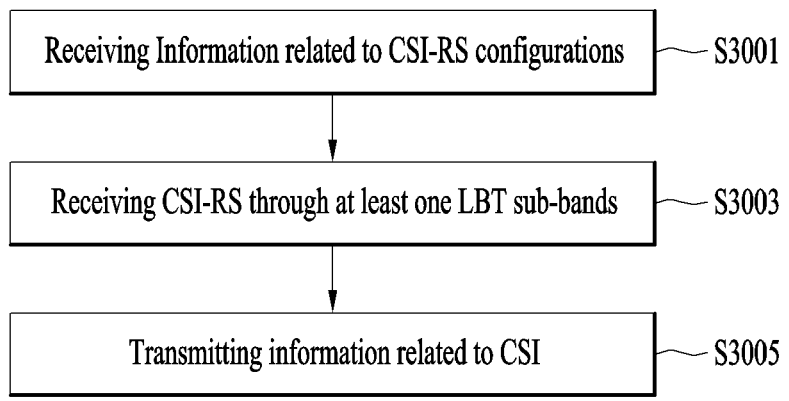
Figure 31:
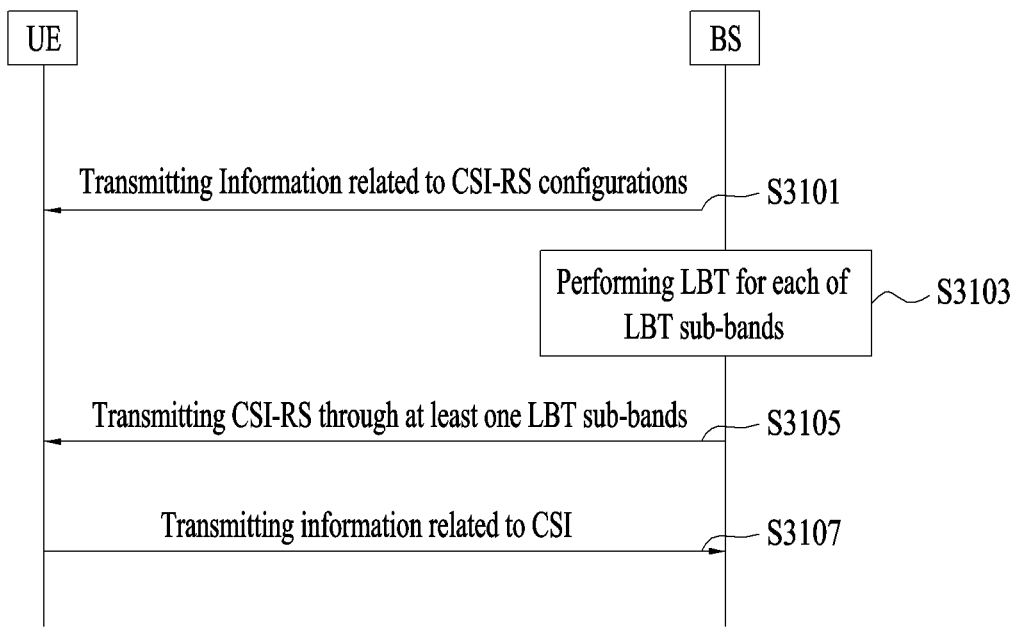

FIGS. 29 to 31 are schematic diagrams illustrating an implementation example of operations of a UE, a BS, and a network according to an embodiment of the present disclosure.

Referring to FIG. 29, a BS may transmit information related to CSI-RS configuration to a UE (S2901). The information may include a setting related to CSI-RS resource setting and information related to a bandwidth for transmitting a CSI-RS.

The BS may divide the entire bandwidth for CSI-RS transmission into a plurality of listen before talk (LBT) sub-bands, and perform LBT for each of the plurality of LBT sub-bands (S2903). In addition, the CSI-RS may be transmitted to the UE through at least one LBT sub-band based on the result of the LBT (S2905). In this case, the method of determining at least one LBT sub-band for transmitting the CSI-RS may be based on embodiments to be described later.

Then, information related to CSI measured based on the CSI-RS may be received from the UE (S2907). Here, the method of measuring and reporting the CSI may be based on embodiments to be described later.

The BS of FIG. 29 may be one of various wireless devices described with reference to FIGS. 3 to 6. For example, the BS may be the second wireless device 200 of FIG. 3, or the wireless device 100, 200 of FIG. 5.

Referring to FIG. 30, the UE may receive information related to CSI-RS configuration from a BS (S3001). The information may include a setting related to CSI-RS resource setting and information related to a bandwidth for transmitting a CSI-RS. The UE may receive the CSI-RS through at least one LBT sub-band among a plurality of LBT sub-bands included in the entire bandwidth for CSI-RS transmission (S3003). Here, the method of determining at least one LBT sub-band for receiving the CSI-RS may be based on embodiments to be described later.

CSI measured based on the received CSI-RS may be transmitted to the BS (S3005). Here, the method of measuring and reporting CSI may be based on embodiments to be described later.

The UE of FIG. 30 may be one of various wireless devices with reference to FIGS. 3 to 6. For example, the UE may be the first wireless device 100 of FIG. 3 or the wireless device 100, 200 of FIG. 5.

Referring to FIG. 31, the BS may transmit information related to CSI-RS configuration to the UE (S3101). The information may include a setting related to CSI-RS resource setting and information related to a bandwidth for transmitting a CSI-RS.

The BS may divide the entire bandwidth for CSI-RS transmission into a plurality of listen before talk (LBT) sub-bands, and perform LBT for each of the plurality of LBT sub-bands (S3103). In addition, it may transmit the CSI-RS to the UE through at least one LBT sub-band based on the result of the LBT (S3105). In this case, the method of determining at least one LBT sub-band for transmitting the CSI-RS may be based on embodiments to be described later.

The UE receiving the CSI-RS transmitted by the BS may transmit, to the BS, CSI measured based on the received CSI-RS (S3107). Here, the method of measuring and reporting the CSI may be based on embodiments to be described later.

Now, methods of transmitting a wideband CSI-RS through a bandwidth larger than the LBT sub-band bandwidth considering the CCA procedure and a CSI reporting method for each transmission method will be described. The CSI-RS in the following embodiments may be a non zero-power (NZP)-CSI-RS.

<CSI-RS Transmission Through the Entire CSI-RS Transmission Bandwidth>

1. CSI-RS Transmission Method

When the frequency band of the CSI-RS includes a plurality of LBT sub-bands, the CSI-RS may be transmitted when it is determined that the channel is idle for all the LBT sub-bands. Here, the LBT sub-bands may be different from the CSI sub-band for CSI reporting, and a CSI sub-band may be set narrower than an LBT sub-band.

2. CSI Reporting Method 1

Measurement and reporting of CSI-RS may be performed in the same manner as a CSI-RS-based reporting method defined in a licensed band. However, when the UE determines that the CSI-RS is subjected to DTX, the UE may explicitly report CSI-RS DTX for CSI. Here, the DTX may mean that the BS does not transmit the CSI-RS because it is determined by CCA that the channel is busy.

The UE may specify the DTX in the CSI reporting using the following methods.

Determining the lowest value as the CQI value and transmitting the same;

Defining a separate event of DTX and a bit field to report the same, and reporting the DTX through the defined field; and Defining a separate event of DTX and reporting the same using a specific state of the existing fields.

In reporting method 1, additional overhead may be produced as the separate bit field is defined or the specific state is used. However, the BS may clearly identify the performance of the UE in DTX detection, and may thus reflect the same in scheduling for the CSI-RS and/or a downlink signal such as PDSCH.

3. CSI Reporting Method 2

Unlike in reporting method 1, measurement and reporting of the CSI-RS may be performed in the same manner as CSI-RS reporting defined in the licensed band, and the UE may not perform an explicit determination of the DTX of the CSI-RS. This is because the BS already knows whether the CSI-RS has been transmitted.

According to reporting method 2, the UE reports the CSI measurement result to the BS. However, since the BS already knows whether the CSI-RS has been transmitted, it may ignore this result or may apply the previously reported CSI value to scheduling of the CSI-RS and/or a downlink signal such as PDSCH.

<CSI-RS Transmission for Each of a Plurality of LBT Sub-Bands>

1. CSI-RS Transmission when CSI-RS Resources are Allocated to the Entire CSI-RS Frequency Band When the frequency band of the CSI-RS includes a plurality of LBT sub-bands, the CCA operation may be performed on a per LBT sub-band basis, and a CSI-RS may be transmitted for an LBT sub-band in which the channel is idle. In this case, CSI reporting may be performed through one configured CSI-RS resource.

2. CSI-RS Transmission when CSI-RS Resources are Allocated to Each of a Plurality of LBT Sub-Bands In configuring a CSI-RS, CSI-RS resources may be allocated on a per LBT sub-band basis.

In addition, the CSI-RS reporting may be configured for each CSI-RS resource, and the UE may perform CSI measurement and reporting according to each LBT sub-band. This may be similar to an operation in the existing licensed band in the sense that a plurality of CSI resources and CSI reporting are configured.

In addition, in the operation of reporting CSI through PUSCH or PUCCH, when the PUCCH/PUSCH resource includes the same time or the same resource, and simultaneous transmission of the PUCCH and the PUSCH is not allowed, the CSI may be reported using one of the PUCCH resource and the PUSCH resource when all information is allowed to be transmitted through the resource. Here, the resource may be a resource capable of transmitting more information.

However, when it is determined that it is impossible to transmit all information through one of the resources, CSI reporting may be performed according to a preset or predefined priority. In determining the priority, it may be desirable to omit information without preferential transmission on a CSI resource for which DTX is determined.

3. Indicating a LBT Sub-Band in which the CSI-RS is Transmitted

A signal or channel for explicitly informing the UE of the LBT sub-band in which the CSI-RS is transmitted may be defined, and the LBT sub-band in which the CSI-RS is transmitted may be signaled to the UE through the defined signal or channel.

For example, the BS may define an initialization signal or the like on a per LBT sub-band basis, and allow the UE to determine whether the CSI-RS is transmitted through detection of the initialization signal. For example, when the UE detects the initialization signal, it may explicitly know, from information contained in the initialization signal, whether the CSI-RS is transmitted in the corresponding LBT sub-band. Alternatively, when the initialization signal is detected, the UE may recognize that that the CSI-RS is to be transmitted in the corresponding LBT sub-band after the initialization signal is detected.

When the UE directly determines whether the CSI-RS is to be transmitted through detection of the initialization signal or blind detection of the CSI-RS, detection reliability may be lowered if the channel quality is poor. Accordingly, the reliability of the detection may be determined through a specific signal and/or channel such as the CRC of the PDCCH.

Here, the CSI-RS may be configured for each UE. However, in general, the resource for transmitting the CSI-RS may be used in common for the UE group or the entire cell. Accordingly, whether the CSI-RS is to be transmitted may be announced for each LBT sub-band using a group-common PDCCH (GC-PDCCH) for transmitting the corresponding information to the UE group or the entire cell. Here, the GC-PDCCH may be a channel for transmitting the information to a plurality of UEs. The GC-PDCCH may be used not only to announce CSI-RS transmission, but also to transmit information on whether a current channel is occupied by the cell and information on an occupied frequency band.

The UE may acquire information on whether the CSI-RS is transmitted and/or information on the LBT sub-band in which the CSI-RS is transmitted through the reception of the GC-PDCCH. It may perform CSI measurement and reporting based on this information. However, when the GC-PDCCH is not detected, the UE may determine that the CSI-RS is transmitted in all LBT sub-bands, or may directly determine whether the CSI-RS is transmitted through blind detection.

In the case of the aperiodic CSI-RS, whether the CSI-RS is transmitted signaled through DCI. Accordingly, when the CSI-RS transmission is signaled through the DCI included in the GC-PDCCH or the like, the LBT sub-band in which the CSI-RS is transmitted may also be signaled.

In addition, in order to ensure that the CSI-RS is transmitted in all LBT sub-bands, the transmission of the CSI-RS may be defined to be performed only within a TxOP (Transmitted in a Single Transmission Opportunity) or a DRS (discovery reference signal) transmission window, and the information on the LBT sub-band in which the CSI-RS is transmitted may be regarded as the same as information on the frequency band occupied by the TxOP.

Here, the TxOP may refer to a certain duration in which access to a specific channel without contention is allowed for fair resource allocation. For example, it may refer to a duration that is set to allow a certain node to use a certain interval from a time when it is determined that the channel is idle for signal transmission.

Here, the period and offset for the DRS transmission window may be set by the network using a signal such as an RRC message, whereas the TxOP may be set according to a specific UE and a UE group using a dynamic signal such as GC-PDCCH.

In addition, when a specific signal or channel for informing the UE of whether a CSI-RS is transmitted is not defined, but PDCCH/PDSCH/initialization signal/TxOP is detected, the UE may determine that the CSI-RS is transmitted in a frequency region or LBT sub-band in which the signal is detected. In addition, it may be assumed that only CSI-RS resources included in the frequency band occupied by the TxOP are transmitted.

When there is an error in the position of the LBT sub-band determined by the UE as DTX, an error may occur when the BS interprets CSI information. Accordingly, information about an LBT sub-band or CSI sub-band in which the associated CSI-RS is transmitted or omitted may be delivered together.

More specifically, when it is signaled through the GC-PDCCH that the BS has occupied specific slots, the UE may assume that the CSI-RS is transmitted within the corresponding resource. At this time, the occupancy status of each LBT sub-band may also be signaled. In this case, the slots known to be occupied should be slots indicated as DL or flexible slots, not UL slots.

When whether the CSI-RS is transmitted is indicated through the GC-PDCCH as described above, but the GC-PDCCH is not detected, the UE may determine that the CSI-RS has not been transmitted in the corresponding slot, and may not need to perform CSI measurement for the corresponding slots.

Alternatively, when the GC-PDCCH is not detected in all possible slots in which a DL (or flexible) symbol included in slot #n may be indicated, the UE may not need to perform CSI measurement in slot #n. For example, when it is configured to indicate a symbol for up to K slots and/or DL/UL/Flexible of the slots through the GC-PDCCH, and a GC capable of indicating a DL (or flexible) symbol period for slot #n If-PDCCH is not detected during slot #n from slot #n−K+1, the UE may not need to perform CSI measurement for slot #n.

In this case, in order to prevent system performance from being degraded due to blind detection, the UE may perform CSI measurement only on resources to which the PDCCH or PDSCH is allocated without the GC-PDCCH configured. At this time, the UE may expect that the measurement restriction will be unconditionally set. For example, a resource to which the PDCCH or PDSCH is allocated may mean only a PDCCH and/or scheduled PDSCH symbol, or a slot including the symbol, or a frequency resource corresponding to the LBT sub-bands including the PDCCH and/or the scheduled PDSCH. In addition, the UE may expect that CSI measurement will not be performed in the cell/carrier/BWP/LBT sub-band in which the GC-PDCCH is not configured.

4. CSI Reporting for a Plurality of LBT Sub-Bands

Partial band transmission of a CSI-RS may be performed. Accordingly, CSI reporting therefor may be basically similar to the method discussed in "CSI-RS transmission through the entire CSI-RS transmission bandwidth," However, there are additional considerations in some aspects, a description will be given thereof.

When partial band transmission of the CSI-RS is allowed, the UE may determine an LBT sub-band in which the CSI-RS is transmitted, or acquire related information through the BS as described above. Then, the UE may measure the CSI for each LBT sub-band in which it is determined that DTX is applied, and report the PMI or CQI for each LBT sub-band using the same. In reporting the CQI, the CSI reporting method described in Embodiment 1-1 may be applied. When a report on the CSI-RS DTX is explicitly transmitted together with the CSI report, the CSI report may be sent on a per LBT sub-band basis. In particular, when it is determined that the CSI-RS is subjected to DTX in a specific LBT sub-band, the UE may omit the CSI report corresponding to the LBT sub-band or transmit CSI information about another LBT sub-band through the corresponding CSI report resource.

(1) When the UE Determines DTX for Each LBT Sub-Band

In the NR system, even when PMI/CQI for each LBT sub-band is set, reporting on RI and wideband PMI/CQI may be requested. In addition, when information about PMI/CQI and the like for each LBT sub-band is invalid or does not have a significant meaning, a DL signal may be scheduled using information such as wideband PMI/CQI.

In this case, when a DL signal is scheduled using channel quality information for an LBT sub-band determined as DTX, an error may occur in the overall wideband PMI/CQI information. Therefore, when the UE determines the DTX status for each LBT sub-band, it may calculate information such as wideband PMI/CQI except for the information on the LBT sub-band that is determined as DTX and does not have valid CSI information. When a CSI report is not configured for each LBT sub-band for the UE, the UE may signal the LBT sub-band that is determined as DTX, and the CSI report thereon. Then, the BS may use this information in the DL signal scheduling operation.

In addition, when a specific LBT sub-band has a large load and thus is highly likely to be subjected to DTX compared to the other LBT sub-bands, the BS may cause the UE to necessarily exclude the specific LBT sub-band in reporting the wideband CSI.

(2) When the UE does not Determine DTX

Since the UE does not perform a determination for an LBT sub-band in which the CSI-RS is not transmitted, the UE may basically perform a measurement operation on CRI/RI/PMI/CQI for each LBT sub-band. Then, when the data channel quality for each LBT sub-band according to channel quality measurement is below a specific level that is predefined or set by the BS with respect to the maximum value or the average value, the CSI values measured in the corresponding LBT sub-band may not be included in the calculation of wideband CSI. The data channel quality may generally correspond to throughput, but a specific value may be used according to CQI.

In this case, the LBT sub-band not considered in the calculation of the wideband CSI may be reported to the BS, or the BS may use the corresponding information in the scheduling operation. In addition, when a specific LBT sub-band has a large load and thus is highly likely to be subjected to DTX compared to the other LBT sub-bands, the BS may cause the UE to necessarily exclude the specific LBT sub-band in reporting the wideband CSI. In addition, even when interference is significantly caused by a neighboring BS in a specific LBT sub-band and the channel quality is considerably poor as well as in the case where the CSI-RS is subjected to DTX, the UE may be set not to consider the LBT sub-band in reporting the wideband CSI.

In addition, when it is determined whether CSI is measured for each LBT sub-band, interference may be measured and applied for an LBT sub-band in which channel measurement is performed. That is, when it is determined whether CSI is measured for each LBT sub-band, interference may be measured in the same LBT sub-band.

Next, description has been given of a case where an LBT sub-band that is subjected to DTX or has a channel quality lower than a reference value is not considered in reporting wideband CSI. In this regard, when the amount of resources for reporting information about CSI is limited and transmission of specific information is omitted and fails, information on the CSI sub-band for the LBT sub-band that is not considered in the calculation of wideband CSI may not be preferentially transmitted.

5. Determining Common Parameter for CSI

Even when the CQI (channel quality indicator) or PMI (precoding matrix indicator) is calculated for each LBT sub-band for a wideband CSI-RS transmitted through a plurality of LBT sub-bands, it is common to assume one value for the CSI-RS resource indicator (CRI), the rank indicator (RI) the wideband PMI.

In addition, when channel quality is measured for each of a plurality of CSI-RS resources and CSI is reported using the same, information on the best beam, rank, or wideband PMI may differ among the LBT sub-bands. In this case, when the BS transmits data to one UE over a wideband, information on the channel quality may be insufficient. For example, when a BWP of 40 MHz is allocated to the UE and the size of each LBT sub-band is 20 MHz, suppose that it is reported that the measured rank is 4 for one LBT sub-band, and 2 for another LBT sub-band. When the BS is to transmit the PDSCH through the 40-MHz BWP, an issue may be raised regarding how to set the rank. In addition, even when one of the two ranks is fixed, scheduling may be inaccurate because there is no CQI information about the fixed rank.

To address this issue, common information may be used or assumed for allocated CSI-RS resource for some pieces of information. That is, in calculating a CQI or a preferred LBT sub-band PMI, one value may be assumed for the CSI-RS resource indicator (CRI), the rank indicator (RI), and the wideband PMI. Accordingly, there is a need for a method for determining a common parameter for the CRI, RI, and wideband PMI. The method may include the following methods.

Accordingly, there is a need for a method for determining a common parameter for the CRI, RI, and wideband PMI. The method may include the following methods.

Figure 32:
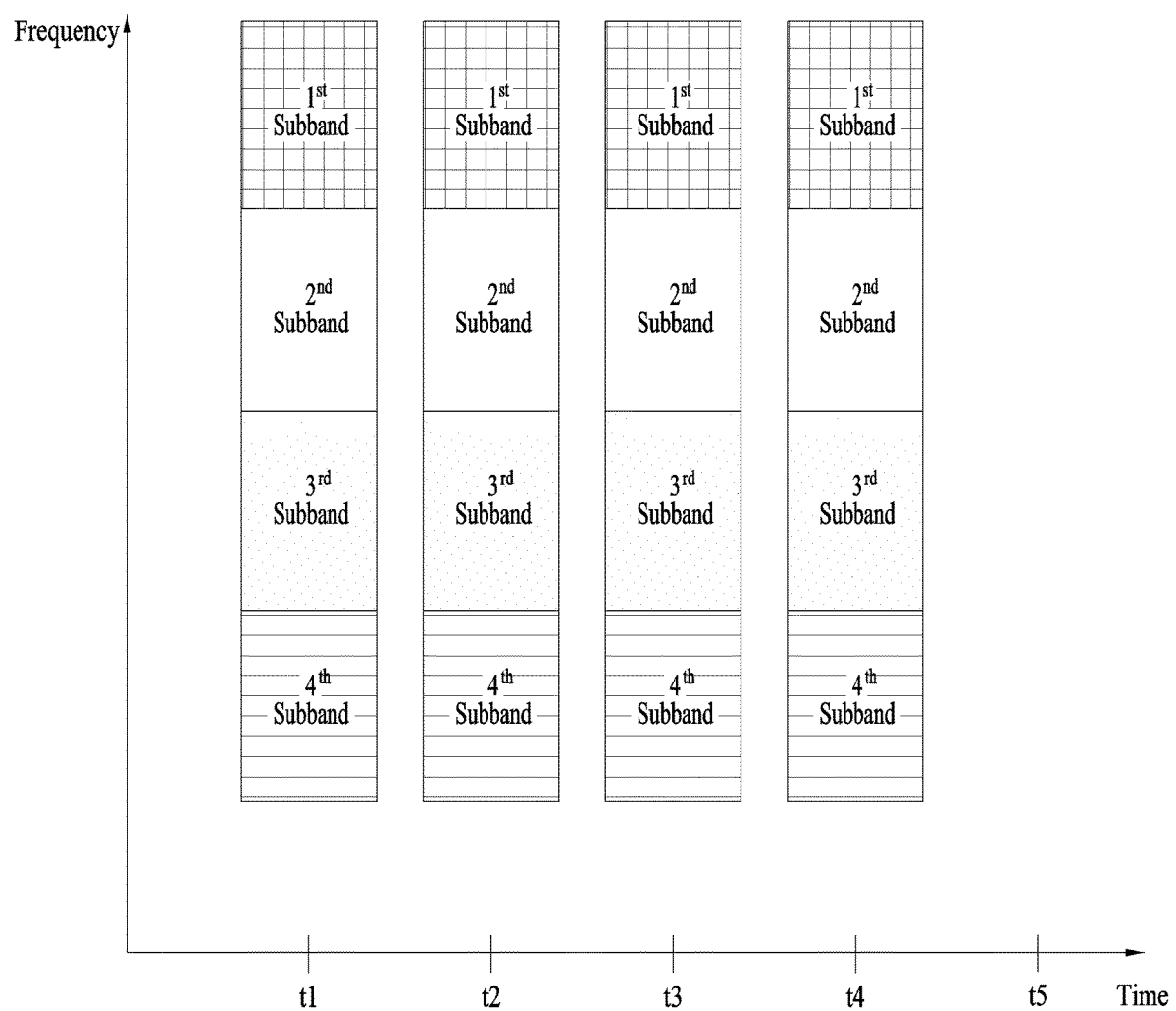
FIG. 32 is a diagram illustrating an implementation example of reporting CSI in an unlicensed band according to the present disclosure.

Reporting of a common parameter may be separately configured for the UE. In addition, the common parameter may be determined using LBT sub-bands determined to be successful in LBT at the time closest to the time of reporting of the common parameter, and the determined common parameter may be applied to all LBT sub-bands. For example, referring to FIG. 32, when the common parameter reporting time is t5, the common parameter may be determined using LBT sub-bands which are successful in LBT at t4, and may be applied to all sub-bands from the first sub-band to the fourth sub-band. When the LBT sub-bands which are successful in LBT at time t4 are the first and third LBT sub-bands, the common parameter may be determined using the first and third LBT sub-bands, and may be applied to all sub-bands from the first sub-band to the fourth sub-band. In this case, the common parameter may be reported for each CSI-RS resource or may be reported through a separate reporting resource.

Even when reporting of the common parameter is not separately configured for the UE, a common parameter update time may be set, the common parameter may be determined using LBT sub-bands determined to be successful in LBT at the time closest to the common parameter update time, and the determined common parameter may be applied to all LBT sub-bands. For example, referring to FIG. 32, when the common parameter update time is t5, the common parameter may be determined using LBT sub-bands which are successful in LBT at t4, and the common parameter may be applied to all LBT sub-bands from the first sub-band to the fourth sub-band. When the LBT sub-bands which are successful in LBT at time t4 are the first and third LBT sub-bands, the common parameter may be determined using the first and third LBT sub-bands, and may be applied to all sub-bands from the first sub-band to the fourth sub-band The BS may set a representative LBT sub-band, and the UE may determine a common parameter only through the representative LBT sub-band and apply the common parameter to all LBT sub-bands. For example, referring to FIG. 32, when the BS sets the second LBT sub-band as the representative LBT sub-band, the UE may determine a common parameter based on the second LBT sub-band and apply the same to all LBT sub-bands from the first LBT sub-band to the fourth LBT sub-band.

The UE, not the BS, may set the representative LBT sub-band, determine the common parameter, and then apply the same to all LBT sub-bands. In this operation, the UE may select an LBT sub-band that has low channel loading and thus has a high possibility of PDSCH transmission as the representative LBT sub-band. Alternatively, it may select a representative LBT sub-band may be selected based on an average channel characteristic for a certain number of LBT sub-bands. Alternatively, a representative LBT sub-band may be selected based on a region having the lowest measured value obtained using the ZP-CSI-RS or reference signal received power (RSSI).

In the case of aperiodic CSI-RS, transmission for all bands may be stably performed through LBT or information on an LBT sub-band in which the CSI-RS is transmitted may be delivered through DCI. Accordingly, a common parameter acquired through the aperiodic CSI-RS may be applied to all CSI reporting using a periodic CSI-RS or semi-persistent CSI-RS transmitted thereafter.

When the CSI-RS is transmitted through a TxOP duration or a DRS transmission window, the DRX probability according to LBT failure may be lowered. Accordingly, the value of the common parameter may be updated based on the CSI-RS transmitted in the TxOP duration or the DRS transmission window, and the updated value may be applied to the CSI-RS transmitted before the next TxOP duration or DRS transmission window.

<CSI-RS Transmission in DRS Multiplexing>

In the NR system, the CSI-RS may be used for RRM measurement. When the CSI-RS is used for RRM measurement, a plurality of transmission positions for the CSI-RS may be defined similarly to the SSB to ensure stable transmission of the CSI-RS, and the CSI-RS may actually be transmitted at one candidate CSI-RS transmission position among the multiple candidate CSI-RS transmission positions depending on whether the LBT is successful.

When a candidate CSI-RS transmission position is included in the DRS window, the candidate CSI-RS transmission position may be set as a position relative to the SSB. When the candidate CSI-RS transmission position is outside the DRS window, it may be set using an absolute slot index and symbol index.

In addition, in generating a CSI-RS sequence, the transmission position of the CSI-RS may vary depending on whether the LBT is successful, and thus resource collision between CSI-RSs and ambiguity may arise. Therefore, a slot index and a symbol index corresponding to a specific candidate CSI-RS transmission position among the candidate CSI-RS transmission positions may be defined to be used, or a QCLed SSB index may be defined to be used for CSI-RS transmission in place of the slot index and/or the symbol index, rather than using the slot index and symbol index at which the CSI-RS is actually transmitted, to generate a sequence of the CSI-RS.

When a slot index and a symbol index corresponding to one specific candidate CSI-RS transmission position are used to generate the CSI-RS sequence, the slot index and/or symbol index at the first candidate CSI-RS transmission position among the candidate CSI-RS transmission positions may be used.

In addition, filtering of the CSI-RS measurement result may be used for RRM measurement. To this end, the transmit power of the CSI-RS may be fixed for all transmission positions irrespective of multiplexing with the DRS.

<CSI Reference Resource>

In the NR system, a CSI reference resource for indicating CSI reporting is defined as follows.

In the frequency domain, the CSI reference resource is defined by a DL PRB group to which the calculated CSI is related.

In the time domain, the CSI reference resource for CSI reporting in UL slot n' is defined as a single downlink slot $n - n_{CSI\_ref}$. Here, $n = \lfloor n' \cdot 2^{\mu_{DL}} / 2^{\mu_{UL}} \rfloor$, where $\mu_{DL}$ and $\mu_{UL}$ may denote subcarrier spacing for DL and UL.

In the case of periodic or semi-persistent CSI reporting, when a single CSI-RS resource for channel measurement is configured, $n_{CSI\_ref}$ should be the least number among the numbers greater than or equal to $4 * 2^{\mu_{DL}}$ and the configured reference resource should be a valid DL slot.

In addition, when multiple CSI-RS resources for channel measurement are configured, $n_{CSI\_ref}$ should be the least number among the numbers greater than or equal to $5*2^{uDL}$, and the configured reference resource should be a valid DL slot.

In aperiodic CSI reporting, if the UE is instructed through DCI to report CSI in the same slot as the slot in which the CSI request is made, $n_{CSI\_ref}$ becomes a reference resource in the same valid DL slot as the slot in which the CSI request is made. Otherwise, $n_{CSI\_ref}$ is determined by $\lfloor Z'/N_{symb}^{slot} \rfloor$, where Z' corresponds to a delay requirement, and DL slot n-$n_{CSI\_ref}$ is a valid DL slot.

When a periodic or semi-permanent CSI-RS/CSI-IM or SSB is used for channel measurement and/or interference measurement, the UE may expect that channel/interference measurement will not be performed from the last OFDM symbol of the CSI-RS/CSI-IM/SSB before the transmission time of the first OFDM symbol for aperiodic CSI reporting to Z' symbols.

A slot that is set by a higher layer to include a DL symbol or flexible symbols and does not correspond to a measurement gap among the slots of the serving cell is regarded as a valid slot. a, However, when a wideband CSI-RS is to be transmitted in an unlicensed band, the CSI-RS may be transmitted through only some LBT sub-bands as described in Embodiment 1. In this case, it may be necessary to change the CSI reference resource or the method of determining the CSI reference resource. For example, the CSI reference resource for the unlicensed band may be defined as follows.

1. CSI Reference Resource in the Frequency Domain

In Embodiment 1, it has been described how the BS informs the UE of an LBT sub-band in which the CSI-RS resource when CSI-RS or transmitting a CSI-RS through a plurality of a CSI-RS resource through which the CSI-RS is transmitted in the case where a wideband CSI-RS is to be transmitted or a CSI-RS is to be transmitted through a plurality of CSI-RS resources over a wideband. Based on this, a resource in the frequency domain through which the CSI-RS has been transmitted and a resource used to calculate a CSI value based thereon may be defined as CSI reference resources in the frequency domain. Alternatively, when it is indicated that all LBT sub-bands corresponding to a specific CSI-RS resource have been transmitted in the frequency domain, all the LBT sub-bands may be defined as valid CSI reference resources.

2. CSI Reference Resource in the Time Domain

It may be difficult to expect stable transmission of the CSI-RS in an area other than a Tx burst occupied by a BS. Accordingly, to ensure stable reception of the CSI-RS, only CSI-RS resources within the Tx burst occupied by the BS maybe used as valid CSI resources. Therefore, when the CSI reference resources defined in the NR system are applied, the definition of the CSI reference resources may be applied only to a slot including the CSI-RS resource present in the Tx burst. In other words, when there is no valid DL slot in a specific transmission burst (Tx burst), all slots in the transmission burst (Tx burst) may not be defined as valid DL slots. In addition, when a measurement restriction is configured, a specific slot included in the most recent TX burst including the CSI reference resource may be defined as a valid DL slot. For example, among DL slots or flexible slots that satisfy the definition of the valid DL slots in the NR system, DL slots or flexible slots included in the most recent transmission burst may be defined as valid DL slots.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although a method for transmitting and receiving channel state information reference signals in the unlicensed band as described above and a device for the same have been described mainly focusing on examples applied to the 5th generation NewRAT system, they may be applied to various wireless communication systems in addition to the 5th generation NewRAT system.

The invention claimed is:

1. A method for reporting, by a user equipment (UE), channel state information (CSI) in an unlicensed band, the method comprising:
   receiving control information on a plurality of Listen before Talk (LBT) sub-bands on which plurality of channel state information-reference signals (CSI-RSs) are to be transmitted;
   monitoring the plurality of CSI-RSs on the LBT sub-bands;
   based on a CSI-RS being received on at least one LBT sub-band among the plurality of LBT sub-bands, measuring at least one CSI for the at least one LBT sub-band;
   generating a wideband CSI for the plurality of LBT sub-bands based on the at least one measured CSI for the at least one LBT sub-band; and
   reporting the generated wideband CSI to a base station, with information on one or more LBT sub-bands on which a CSI-RS is not received, among the plurality of LBT sub-bands.

2. The method of claim 1, wherein the at least one CSI includes a channel quality value exceeding a threshold.

3. The method of claim 1, wherein the plurality of LBT sub-bands is included in a CSI-RS transmission time closest to a time for reporting the wideband CSI, among a plurality of CSI-RS transmission times for transmitting the CSI-RS.

4. The method of claim 1 further comprising:
communicating with at least one of another UE, a network, a base station, and an autonomous vehicle.

5. A user equipment (UE) for reporting channel state information (CSI) in an unlicensed band, the UE comprising:
at least one transceiver;
at least one processor; and
at least one computer memory operably connectable to the at least one processor and storing instructions that, when executed by the at least one processor, perform operations comprising:
receiving control information on a plurality of Listen before Talk (LBT) sub-bands on which plurality of channel state information-reference signals (CSI-RSs) are to be transmitted;
monitoring the plurality of CSI-RSs on the LBT sub-bands;
based on a CSI-RS being received on at least one LBT sub-band among the plurality of LBT sub-bands, measuring at least one CSI for the at least one LBT sub-band;
generating a wideband CSI for all of the plurality of LBT sub-bands based on the at least one measured CSI for the at least one LBT sub-band; and
reporting, via the at least one transceiver, the generated wideband CSI to a base station, with information on one or more LBT sub-bands on which a CSI-RS is not received, among the plurality of LBT sub-bands.

6. The UE of claim 5, wherein the at least one CSI includes a channel quality value exceeding a threshold.

7. The UE of claim 5, wherein the plurality of LBT sub-bands is included in a CSI-RS transmission time closest to a time for reporting the wideband CSI, among a plurality of CSI-RS transmission times for transmitting the CSI-RS.

8. The UE of claim 5, wherein the operations further comprise:
communicating with at least one of another UE, a network, a base station, and an autonomous vehicle.

9. An apparatus for reporting channel state information (CSI) in an unlicensed band, the apparatus comprising:
at least one processor; and
at least one computer memory operably connectable to the at least one processor and storing instructions that, when executed by the at least one processor, perform operations comprising:
receiving control information on a plurality of Listen before Talk (LBT) sub-bands on which plurality of channel state information-reference signals (CSI-RSs) are to be transmitted;
monitoring the plurality of CSI-RSs on the LBT sub-bands;
based on a CSI-RS being received on at least one LBT sub-band among the plurality of LBT sub-bands, measuring at least one CSI for the at least one LBT sub-band;
generating a wideband CSI for all of the plurality of LBT sub-bands based on the at least one measured CSI for the at least one LBT sub-band; and
reporting the generated wideband CSI to a base station, with information on one or more LBT sub-bands on which a CSI-RS is not received, among the plurality of LBT sub-bands.

* * * * *